United States Patent
Neil et al.

(10) Patent No.: US 9,575,944 B2
(45) Date of Patent: Feb. 21, 2017

(54) DIRECTIONAL NAVIGATION OF PAGE CONTENT

(71) Applicant: BlackBerry Limited, Waterloo (CA)

(72) Inventors: Timothy Allen Neil, Mississauga (CA); James Roger Blashill, Mississauga (CA); Lei Li, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 167 days.

(21) Appl. No.: 14/458,601

(22) Filed: Aug. 13, 2014

(65) Prior Publication Data

US 2014/0351691 A1  Nov. 27, 2014

Related U.S. Application Data

(63) Continuation of application No. 12/615,001, filed on Nov. 9, 2009, now Pat. No. 8,843,849.

(51) Int. Cl.
*G06F 3/048* (2013.01)
*G06F 17/22* (2006.01)
*G06F 3/0482* (2013.01)
*H04L 29/08* (2006.01)

(52) U.S. Cl.
CPC ......... *G06F 17/2247* (2013.01); *G06F 3/0482* (2013.01); *H04L 67/10* (2013.01)

(58) Field of Classification Search
CPC ....... G06F 3/0481; G06F 3/14; H04L 67/2823
See application file for complete search history.

(56) References Cited

U.S. PATENT DOCUMENTS

| 7,111,243 B1* | 9/2006 | Ballard ............... G06F 8/38 707/999.102 |
| 7,571,393 B2 | 8/2009 | Premchandran et al. |
| 7,735,016 B2* | 6/2010 | Celik ............ G06F 3/0481 715/767 |
| 2003/0137538 A1 | 7/2003 | Hesmer et al. |

(Continued)

FOREIGN PATENT DOCUMENTS

EP  1840520 B1  9/2008

OTHER PUBLICATIONS

W3C, W3C Candidate Recommendation May 11, 2004, CSS3 Basic User Interface Module, http://www.w3.org/TR/css3-ui/, accessed May 10, 2009, 53 pgs.

(Continued)

*Primary Examiner* — Jeffrey A Gaffin
*Assistant Examiner* — Ayesha Huertas Torres
(74) *Attorney, Agent, or Firm* — Rowand LLP

(57) ABSTRACT

A system and method for displaying and navigating through structured content, such as a webpage, is provided. The content includes focusable elements, at least one of which is a non-enableable element that is normally not capable of gaining focus when the content is displayed in a browser or other viewing application. Navigation of the content by moving focus from one element to another includes moving the focus to the focusable, non-enableable element. The non-enableable element is defined as a focusable element by an attribute. Focusable elements may also be defined with attributes for capturing directional navigation instructions and calling event handling functions in response to detected directional navigation instructions.

20 Claims, 16 Drawing Sheets

(56) References Cited

U.S. PATENT DOCUMENTS

| | | |
|---|---|---|
| 2004/0210851 A1 | 10/2004 | Premchandran et al. |
| 2005/0261909 A1* | 11/2005 | Sienel ................. H04L 67/2823 704/270.1 |
| 2006/0112346 A1 | 5/2006 | Miksovsky et al. |
| 2009/0182501 A1 | 7/2009 | Fyke et al. |
| 2009/0235187 A1 | 9/2009 | Kim et al. |

OTHER PUBLICATIONS

Opera Software ASA, Opera: Tutorial—Use Opera without a mouse, 2009, http://www.opera.com/browser/tutorials/nomouse/, accessed May 10, 2009, 11 pgs.

Bickmore, T. et al, "Web Page Filtering and Re-Authoring for Mobile Users", Apr. 21, 1999, The Computer Journal vol. 42, No. 6, 1999, accessed from the internet on May 6, 2010 at: http://comjnl.oxfordjournals.org/cgi/content/short/42/6/534.

International Search Report dated Jul. 14, 2010 received in PCT/CA2009/001613.

W3C, W3C Recommendation Dec. 22, 2008, Scalable Vector Graphics (SVG) Tiny 1.2 Specification: Interactivity, http://www.w3.org/TR/SVGTiny12/interact.html, accessed May 10, 2009, 28 pgs.

CIPO, CA Office Action relating to Application No. 2,778,406, dated Feb. 10, 2015.

EPO, EP Office Action relating to Application No. 09851009.2, dated Mar. 17, 2015.

\* cited by examiner

DIRECTIONAL NAVIGATION OF PAGE CONTENT

CROSS-REFERENCE TO RELATED APPLICATIONS

This application is a continuation of application Ser. No. 12/615,001, filed Nov. 9, 2009, the entirety of which is incorporated by reference.

BACKGROUND

1. Technical Field

The present invention relates generally to navigation of structured content on a data processing or communication device, and in particular to navigation through the movement of element focus in response to user input.

2. Description of the Related Art

Documents, such as web pages or structured documents having content encoded with structural information, may be viewable on a data processing or communication device using applications such as web browsers or other content viewing applications. When the displayable area of the content extends beyond the limits of the viewable region on the communication device display, the user may scroll through the content from top to bottom or from bottom to top using a user input interface, such as a trackball, scroll wheel, trackpad, keyboard, or the like.

Alternatively, whether the content is entirely viewable on the communication device display or not, the user may navigate through or traverse the content from one focusable element to another, according to the structural information encoded within the content. For example, the user may effectively scroll through content such as a webpage document by jumping from hyperlink to hyperlink or from anchor to anchor within the document. This type of navigation is generally linear in nature; when a user jumps from one focusable element to another, the order of elements is determined by the order of presentation defined by the content's structural information concerning the ordering of the elements rather than by the element's position on the display. As a result, the flow of navigation within the content may not coincide with the user's expectations. When the user initiates a command to shift the focus to the next focusable element, the user may expect the focus to shift to the element that is perceived to be the next logical element, whereas the content encoded structure defines a different element as the next focusable element. The rigid ordering of focusable elements within the content also limits the content developer's ability to control the user's navigation through the content.

BRIEF DESCRIPTION OF THE DRAWINGS

In drawings which illustrate by way of example only embodiments of the present invention.

DETAILED DESCRIPTION

The embodiments described herein provide a system and method for navigating or traversing content in a customizable, directional manner, and for controlling the focusability of elements within the content. There is also provided a system and method for triggering actions to occur upon detection of specific navigation events.

These embodiments will be described in relation to a mobile wireless communication device, hereafter referred to as a communication device, having a display for displaying content within a graphical user interface. It will be appreciated by those skilled in the art, however, that this description is not intended to limit the scope of the described embodiments to communication devices. The methods and systems described herein may be applied to any appropriate communication or data processing device, whether portable or wirelessly enabled or not, including without limitation cellular phones, smartphones, wireless organizers, personal digital assistants, desktop computers, terminals, laptops, tablets, handheld wireless communication devices, wirelessly-enabled notebook computers and the like.

Figure 1:
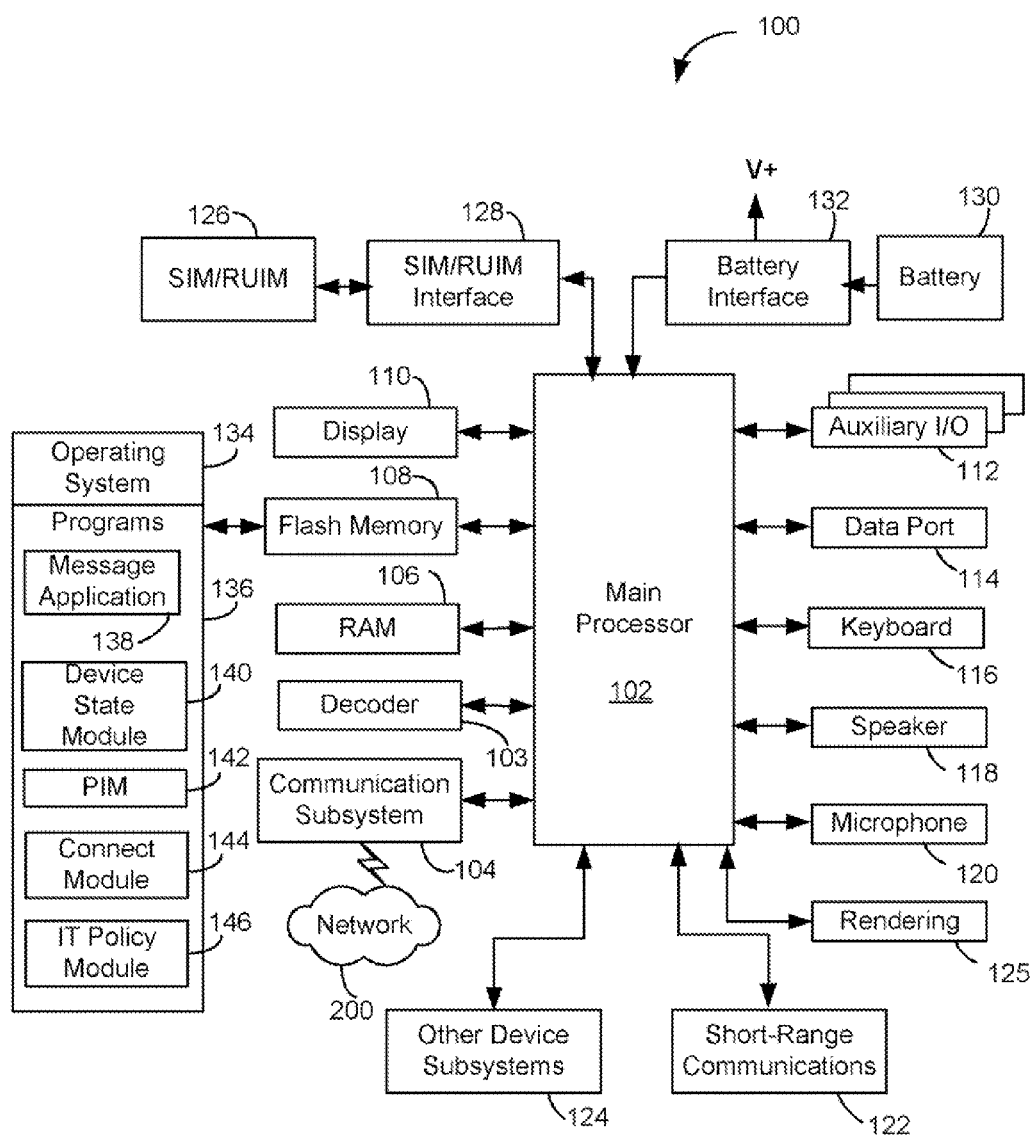
FIG. 1 is a block diagram of an embodiment of a mobile device.
Figure 2:
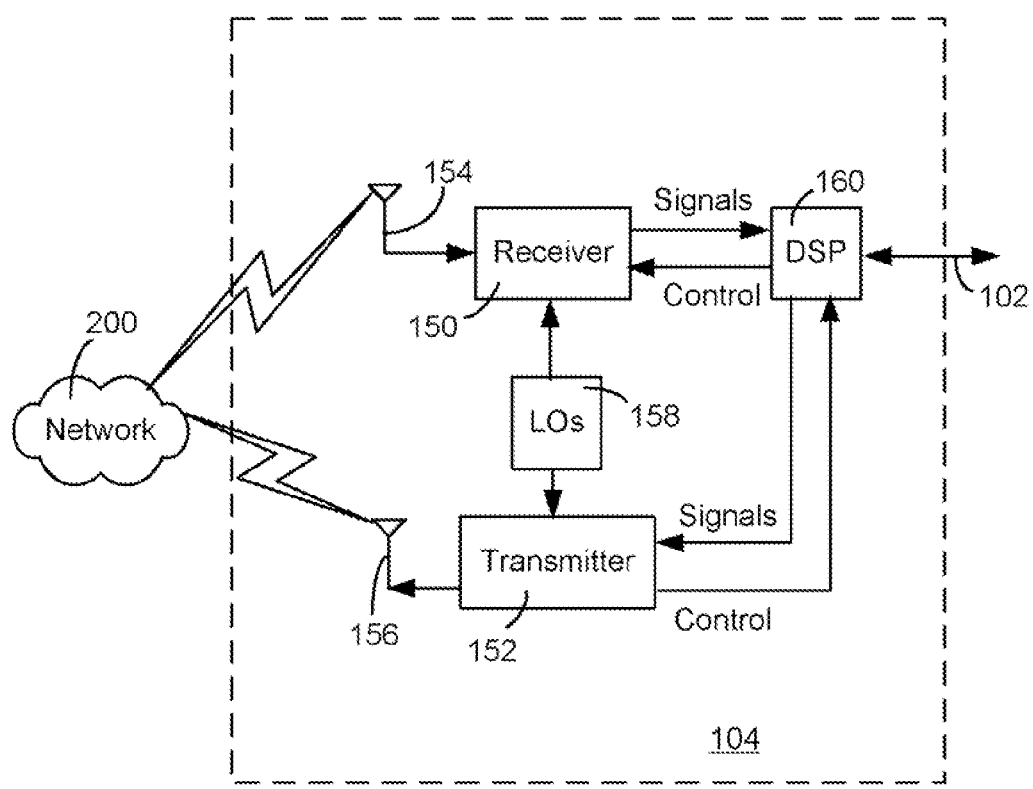
FIG. 2 is a block diagram of an embodiment of a communication subsystem component of the mobile device of FIG. 1.
Figure 3:
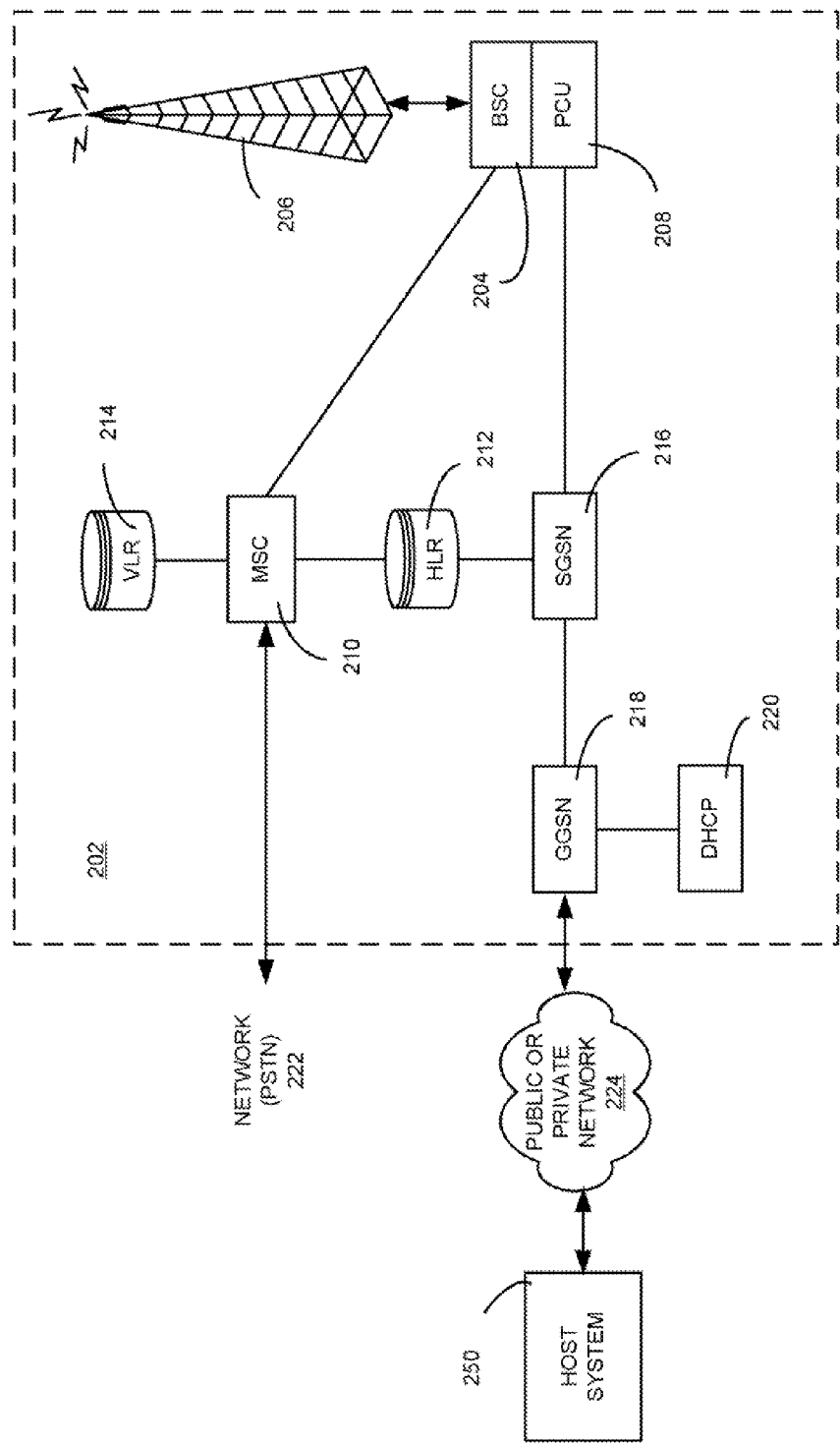
FIG. 3 is an exemplary block diagram of a node of a wireless network for use with the mobile device of FIG. 1.
Figure 4:
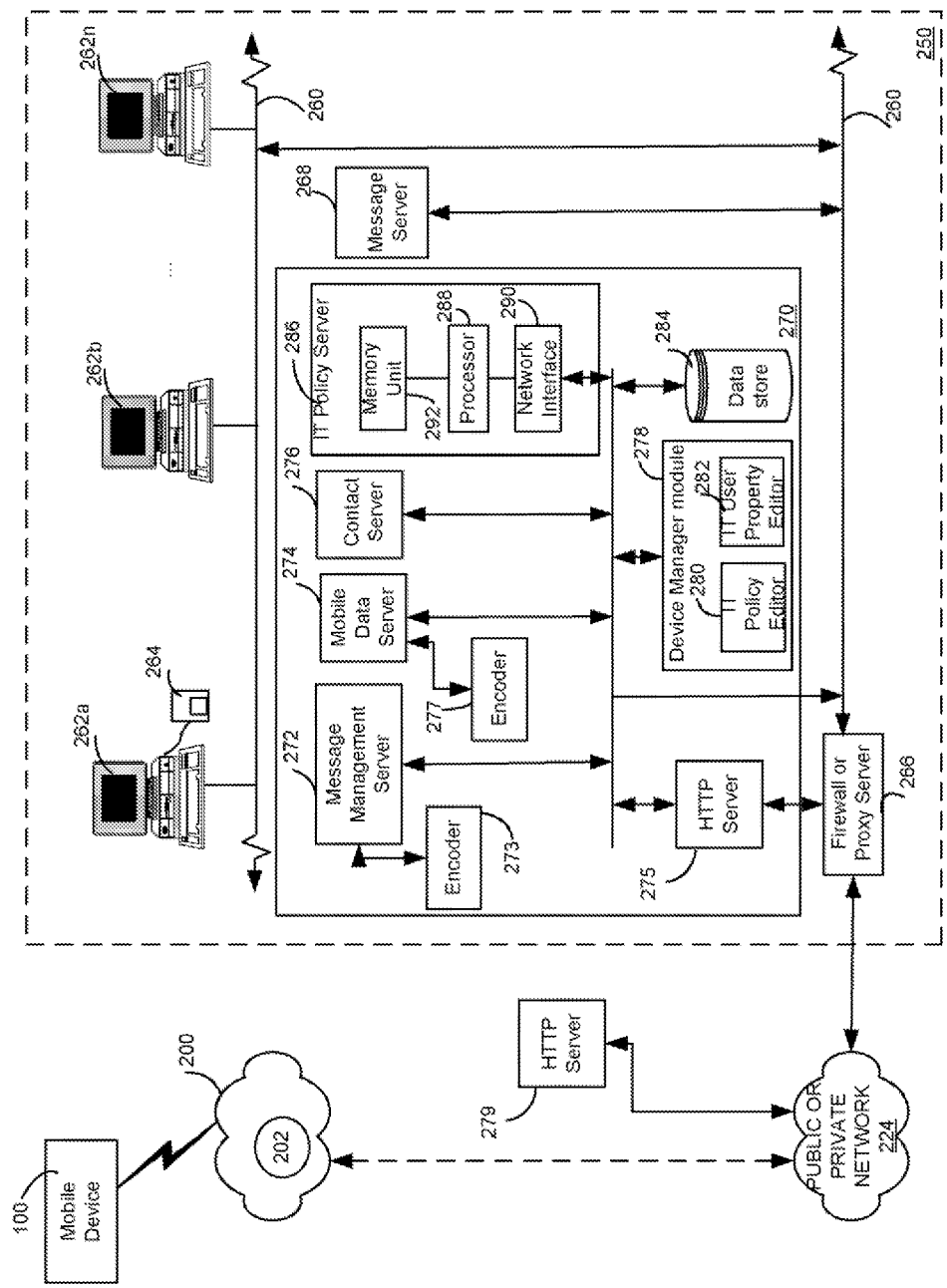
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering circuit 125 may be implemented as hardware, software, or as a combination of both hardware and software.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's communication device 100 is situated on a LAN connection. The cradle 264 for the communication device 100 can be coupled to the computer 262*a* by a serial or a Universal Serial Bus (USB) connection, for example. Other user computers 262*b*-262*n* are also situated on the network 260, and each can be equipped with an accompanying cradle 264. The cradle 264 facilitates the loading of information (e.g. PIM data, private symmetric encryption keys to facilitate secure communications) from the user computer 262*a* to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262*a*-262*n* are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262*a* can request the e-mail messages associated with that user's account stored on the data store associated with the message server 268. These messages are then retrieved from the data store and stored locally on the computer 262*a*. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Rendering data files originally optimized or prepared for visualization on large-screen displays on a portable electronic device display often requires additional processing prior to visualization on the small-screen portable electronic device displays. According to an embodiment, this additional processing is accomplished by the rendering engine 125 shown in FIG. 1. As will be appreciated by those of skill in the art, the rendering engine can be implemented in hardware, software, or a combination thereof, and can comprise a dedicated image processor and associated circuitry, or can be implemented within main processor 102.

Figure 5A:
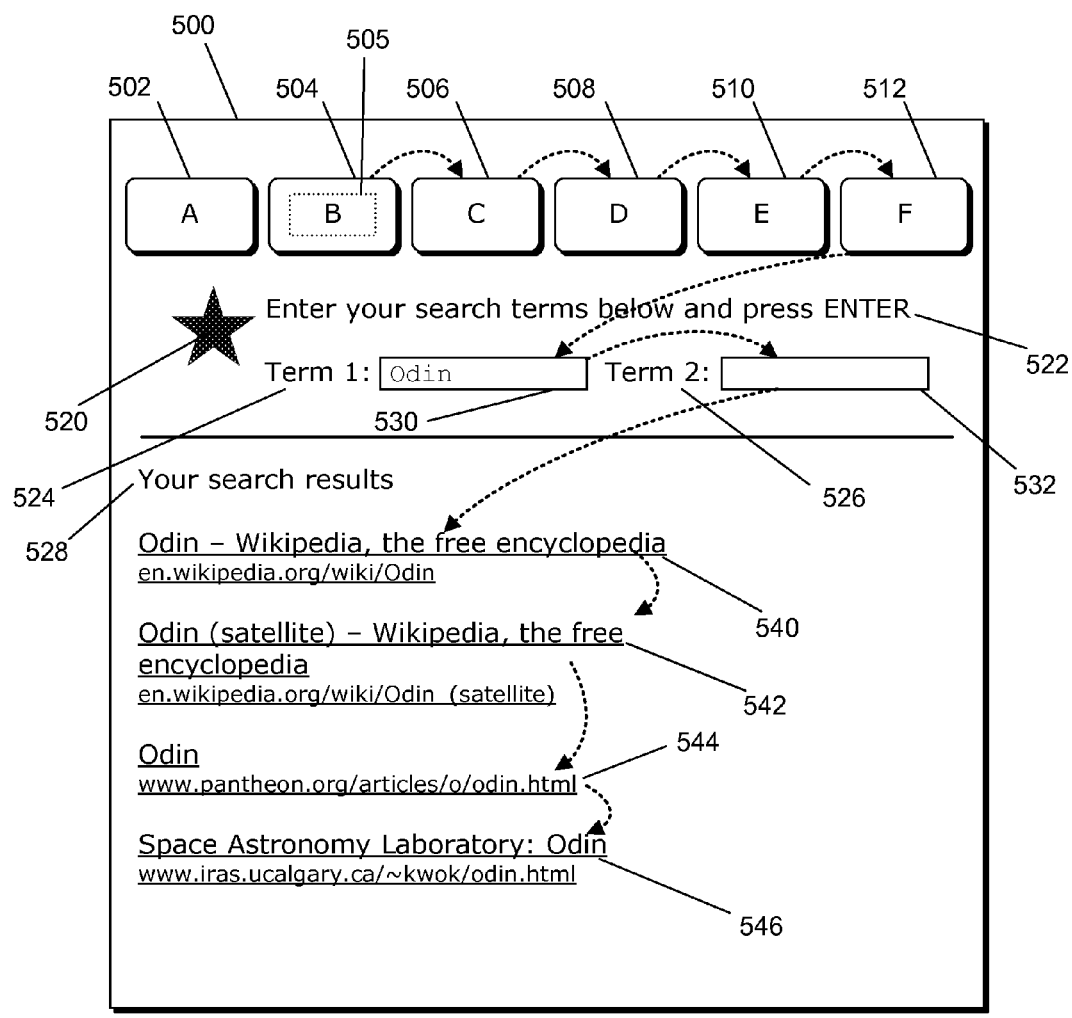
FIGS. 5A, 5B and 5C are examples of content comprising a number of navigable elements.

Turning to FIG. 5A, an example of structured content 500 as it would be displayed on a communication device 100 using a client application is shown. The content 500 may be a web page document or other document authored in hypertext markup language (HTML) or in another structured markup language; it may comprise or be rendered in conjunction with scripts, dynamic content, presentation markup, style sheets, or other programming content that is processed within the environment provided by the client application executing on the device 100 to display the content 500. The client application may be a web browser or other content viewer for displaying the content. The construction of HTML web pages and other structured content with enabled and focusable elements using known structural and presentation standards such as HTML 4.01, XHTML 1.0, HTML 5, DOM Levels 1 through 3, and CSS Levels 1 through 3, published by the World Wide Web Consortium (W3C) at w3.org, will be known to those skilled in the art. The content 500 may comprise or be associated with elements such as JavaScript published by the Mozilla Foundation, Mountain View, Calif., www.mozilla.org; Adobe Flash technologies from Adobe Systems Incorporated, San Jose, Calif.; dynamic HTML technology, widgets, modules, code snippets, and the like, which may be delivered together with the content 500 to the communication device 100, or which alternatively may be downloadable separately by the client application for use with the content 500. The selection and implementation of these and other suitable existing and future structural or presentation standards, various elements, scripting or programming languages and their extensions, will be known to those of skill in the art.

In FIG. 5A, the elements 502 to 512 may be "clickable" buttons or other elements that are defined as being enabled and focusable, so that the user may select and actuate them. Conventionally, an enabled element is a piece of content that is capable of gaining focus and is associated with a behaviour such as an event handling action, such that the enabled element can be selected and actuated through a user interface or application programming interface to trigger that behaviour. The enabled element is included in the navigation order when the user navigates or traverses through the content. A disabled element is an element that is normally enabled or capable of being enabled, but is currently not in the enabled state (for example, an attribute associated with the element's enabled state may be set to "disabled"), such that it is not capable of gaining focus, cannot be selected or actuated, and is excluded from the navigation order. Enabled elements include the set of interactive elements defined in HTML 4.0 and other markup languages. Thus, elements that are capable of being enabled and disabled—that is to say, enableable elements—may include elements such as form elements (e.g., <textarea>, <input>, <select>, and <button> mentioned above), links and anchors (e.g., <a>), and image maps. These elements can be actuated by a user, for example by entering data in an <input> field, selecting data presented in a <select>element, or clicking on a <button> element. Elements that are not enableable ("non-enableable") are thus elements that are thus not capable of gaining focus and generally include conventionally non-interactive elements. Element 520 is an image element embedded in the content 500. Elements 522, 524, 526 and 528 are text elements. Elements 530, 532 are text input boxes for user entry of data. Elements 540, 542, 544, and 546 are hypertext elements, which are encoded so as to be interpreted as hyperlinks by the browser or other viewing application used on the communication device 100 to display the content 500. When one of these elements 540, 542, 544, 546 is in focus and is actuated by the user, the browser or other viewing application may cause the content linked by that element to be opened in the same or a different viewing window.

When the content 500 is displayed on the communication device 100, the user may navigate through the content 500 by moving the focus within the content from one enabled element to another. An element that is in focus is the element that is currently selected for user input or for actuation. For example, in FIG. 5A element 504 (button "B") is currently in focus, as indicated by broken box 505. It will be appreciated that the focus is illustrated as a broken box for convenience in the accompanying drawings. Focus may be indicated on the communication device display 110 in other ways, such as by highlighting or underlining the entire element or the text within the element; alternatively, the focus may not be indicated on the display 110 at all. The appearance or behaviour of the element when it is in focus may be defined by attributes within the encoded content 500 itself, or alternatively in an associated file, such as a cascading style sheet (CSS) document. These attributes are interpreted by the client application when the content 500 is rendered for display on the communication device 100. For example, the effect when an element gains focus may be determined by CSS code defining styles for particular element pseudo-classes, such as ":hover". When focus is transferred to an element with a defined ":hover" style, the element may be displayed according to the attributes defined in that style. Additionally, when an element gains focus, it may receive a "mousemove" event, and thus trigger an event handling routine associated with that event.

When an element is in focus, it may be actuated if it is an enabled element. For example, an enabled input button in a form presented in the content 500, when the button is in focus, may be actuated by the user to submit data that was input by the user into the form. The user may move the focus from element 504 to another element by means of a user input/output subsystem 112, such as a trackball, scroll wheel, touchpad, joystick, touchscreen actuated by user or stylus touch, or other input device such as a mouse or a physical or virtual keyboard or button. For example, the "tab", down arrow, or right arrow key on a physical or virtual keyboard, a user gesture on a touchpad or touchscreen indicating a downwards movement, or a scroll downwards on a trackball or scroll wheel may correspond to an instruction to move focus from the current element to the next element, whereas the up arrow key on a keyboard, a user gesture indicating an upwards movement on a touchpad or touchscreen, or a scroll upwards on a trackball or scroll wheel may correspond to an instruction to move focus from the current element to the previous element.

In the example of FIG. 5A, navigation within the content 500 may behave in a linear manner. When the user invokes the instruction for moving focus from the current element to the next element, in the content of FIG. 5A focus may move from the element 504 to the next element 506 (button "C"). A subsequent instruction to move focus from the element 506 to the next element would thus move the focus from the element 506 to the element 508, and so on. This order of focus movement is illustrated by the arrows in FIG. 5A. After traversing the elements 502 through 512, on the next instruction to move focus to the next element, focus would be moved to the first text input box 530, then upon a further instruction to move focus to the next element, the focus would move to the second text input box 532. A further instruction to move focus to the next element would then move focus from the second text input box 532 to the first hyperlink element 540, and so on down through the remaining hyperlink elements 542 through 546. Similarly, an instruction to move focus from the current element to a previous element would move the focus in the opposite order indicated by the arrows in FIG. 5A, from element 546 to element 544, and so on. From the button "B", element 504, the instruction to move focus from the current element to the previous element would move the focus to the element 502 (button "A").

This direction of navigation illustrated in FIG. 5A may be termed "linear" because it follows the logical order defined by the structure encoded in the content 500, rather than the order that the user may perceive as logical according to the page layout. For example, given the appearance of the content 500 in FIG. 5A, the user may expect that actuating the tab key on a keyboard, or otherwise invoking the instruction to move focus to the next element, would move the focus downwards to the first input text box 530 rather than across to the next button element 504, because the next area of interest to the user on the page would normally be the first input text box 530 and not the button element 504. Furthermore, if focusable elements on the page are not generally aligned in a regular grid arrangement, such as the elements 502 through 512 in FIG. 5A, it may not be clear to the user in which direction focus will move. Where the communication device 100 includes user input subsystems 112 that provide for multidirectional navigation via a single interface—such as a touchpad, touchscreen, or trackball, which can detect user gestures moving both left and right, as well as up and down—it is desirable to provide page navigation responsive to these multiple directions.

Figure 5B:
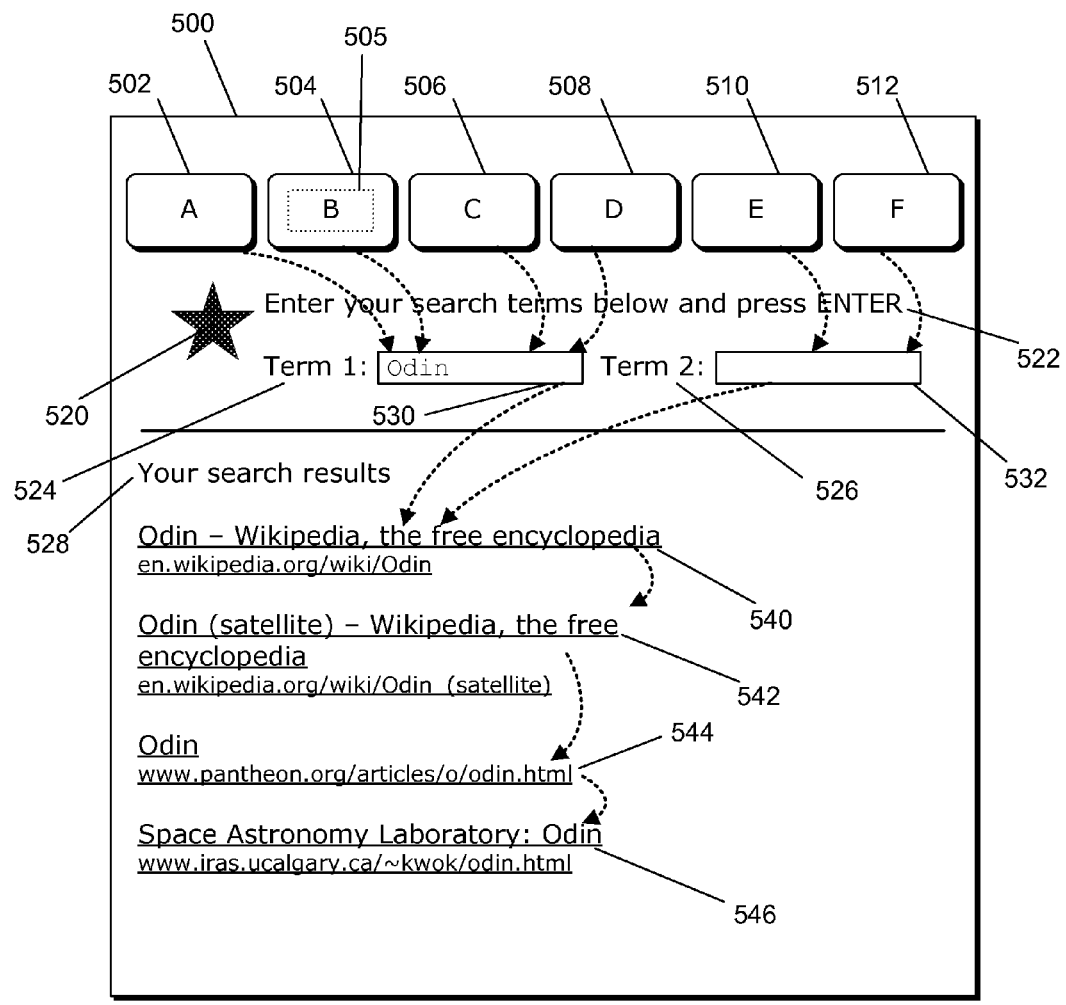
Figure 11:
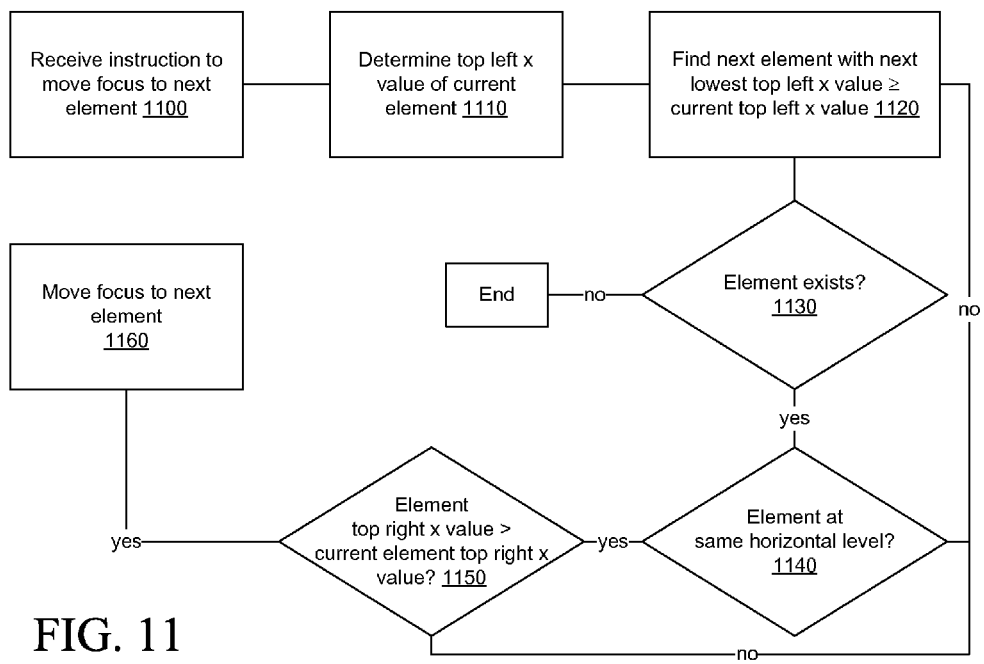
FIG. 11 is a flowchart illustrating a further method for determining the navigation flow from one element to the next within the content.

Accordingly, FIG. 5B illustrates a different modality for navigating or traversing content 500 that may be implemented in a client application displaying the content 500. FIGS. 5B through 8 pertain to generally vertical navigation in a vertical direction on a display 110. FIGS. 9 to 11, discussed below, pertain to generally sideways navigation. In FIG. 5B, arrows depict the result of user-invoked instructions to move the focus to the next element in a generally "downward" direction, that is to say in a general direction of increasing paragraph order or from one line to the next associated with reading Western-style (i.e., English-style) texts. Thus, when a page is traversed from a current element in focus near the top of the content 500 as displayed on the device 100, an instruction to move to the next element will move the focus to an element below the set of elements that are at the same general horizontal level as the current element. In FIG. 5B, the element 504 (button "B") may be considered to be the current element in focus, as illustrated by the broken box 505. Other elements in the content 500 located at the same general horizontal level as the current element in focus 504 are the elements 502, 506, 508, 510 and 512. Upon detection of an instruction to move the focus to the next element downwards, the client application responds by moving the focus to the next element located below the horizontal level of the current element 504 that is the most vertically aligned with the current element 504. In the example of FIG. 5B, this next element is text input box 530. Accordingly, an arrow depicting the direction of navigation in response to the instruction is shown in FIG. 5B connecting the current element 504 with the text input box 530.

Similarly, if the current element in focus were one of elements 502, 506, or 508, the direction of navigation in response to the instruction would result in focus moving to the same element, text input box 530. The text input box 530 represents the next focusable element that is located below the horizontal level of elements 502, 506, and 508, and that is the most vertically aligned with those elements. As for the remaining button elements 510, 512 of the content 500, while both of the text input boxes 530, 532 are at the same height below the elements 510, 512, it is the text input box 532 that is the most vertically aligned with either of the elements 510, 512. Accordingly, if either one of the elements 510, 512 is the current element in focus and an instruction to move the focus downwards is received, the focus will move to the text input box 532 rather than the text input box 530.

Furthermore, unlike the modality described with respect to FIG. 5A, if the first text input box 530 is in focus and an instruction to move the focus downwards to the next element is received, rather than moving the focus to the second text input box 532, in FIG. 5B the focus moves to the first hyperlink 540, because the first and second text input boxes 530, 532 are located at the same horizontal level whereas the first hyperlink 540 is located below that horizontal level, and is the most vertically aligned with the first text input box 530. Similarly, if the second text input box 532 is in focus and the same instruction is received, the focus may then move down to the first hyperlink 540 for the same reason. After the focus moves to the first hyperlink 540, navigation may move in a manner similar to that described with respect to FIG. 5A, with focus moving next to the second hyperlink 542, and so on to hyperlinks 544 and 546, in response to further instructions to move the focus downwards.

Figure 5C:
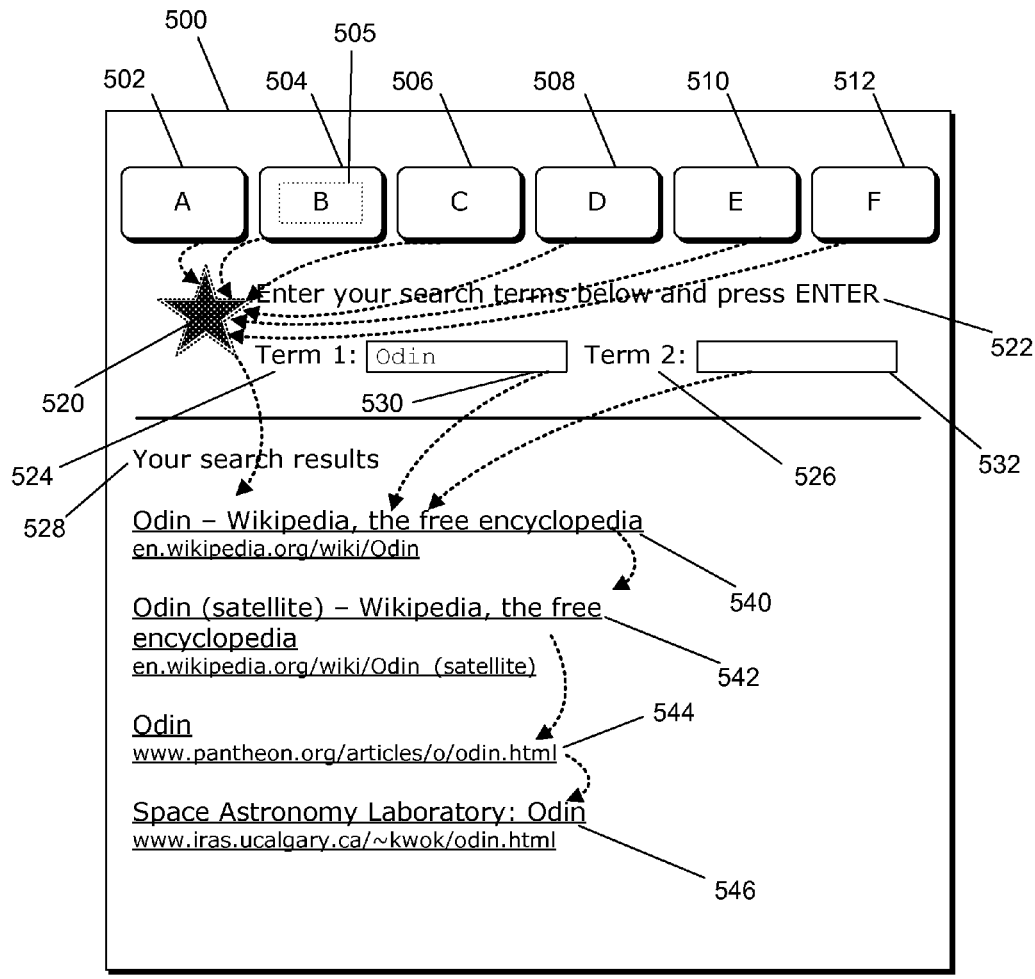

The image element 520 illustrated in FIG. 5B is a non-focusable element, and thus focus does not move to it in the modality described with respect to FIG. 5B. If, however, the image element 520 were focusable, navigation or traversal of the content 500 may be different. Turning to FIG. 5C, alternate navigation paths are shown as a result of the image element 520 becoming focusable. The image element 520 is located vertically above both the text input boxes 530, 532, so accordingly, when one of the elements 502 through 512 is in focus and in instruction is received to move the focus downwards to the next element, the focus will be moved to the image element 520, as illustrated by the arrows between the elements 502 through 512 and the image element 520. Although the image element 520 is not vertically aligned with any one of elements 504 through 512, it is still the next highest focusable element.

Also with reference to FIG. 5C, if the current element in focus is the image element 520 and an instruction is received to move the focus downwards to the next element, then the focus will move to the first hyperlink 540, because both the first and second text input boxes 530, 532 are considered to be located at about the same horizontal level as the image element 520. Once the first hyperlink 540 is in focus, again subsequent instructions to move the focus downwards to the next element will result in focus being moved to elements 542 through 546 in turn.

Thus, navigation or traversal of the content 500 in the manner illustrated in FIGS. 5B and 5C follows a path that may accord more with the user's expectations than the manner illustrated in FIG. 5A. The determination of which element constitutes the "next" element in response to an instruction to move the focus downwards from the currently focused element is described FIGS. 7A though 7H and in FIG. 8.

Figure 6:
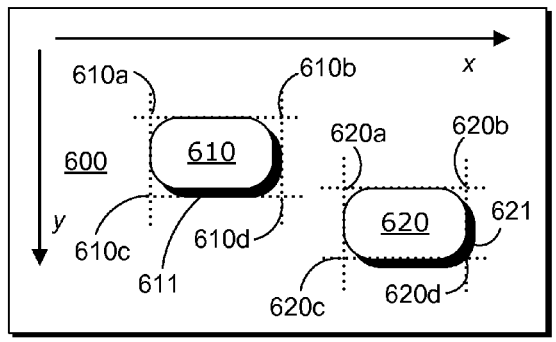
FIG. 6 is a schematic representation of methods for determining the positions of elements within content presented in a display.

As a preface to a discussion of these figures, it should be noted that in the embodiments discussed herein reference is made to the x and y positions of elements when displayed on the communication device 100. As will be understood by those skilled in the art, positioning of elements within the content may be defined using an x-y grid, defining the absolute or relative positions of elements with respect to the display 110 or to a window or other viewport of a graphical user interface displayed via the display 110. If elements are assumed to have a rectangular shape, the position of an element may be defined with x and y values. This is illustrated in FIG. 6, which shows content 600 comprising elements 610 and 620. The positions of elements within the content 600 as displayed are measured along the illustrated axes x and y, where coordinates (0, 0) may be the top left-hand corner of the content 600 as it is displayed in the display 110, and where x increases from left to right and y increases from top to bottom, or in other words, increases in typical reading direction. For the first element 610, the position of the element within the content 600 may be defined with reference to the top-left, top-right, bottom-left and bottom-right corners, 610a, 610b, 610c, and 610d respectively. Each of these corners may be defined with (x, y) coordinates, so for example the top-left corner 610a of the element 610 will have a top-left-x and a top-left-y value, and so on. The top-left and top-righty values would each define an upper bound value of the element 610, and the bottom-left and bottom-right y values would each define a lower bound value of the element 610. Similarly, the top-left and bottom-left x values would each define a leftmost bound value, and the top-right and bottom right y values would each define a rightmost bound value of the element 610.

The coordinates defining the corners of the element are determined by the attributes of the element itself, but it will be appreciated by those skilled in the art that certain attributes that are perceived by the user as forming part of the element may not be used to determine the element position. For example, in FIG. 6, both the elements 610 and 620 are illustrated with drop shadows 611, 621 respectively. The drop shadow attribute may form part of the element for the purpose of determining the element position, as shown with respect to the first element 610, where the corners of the element 610a through 610d are defined with reference to the outer edges of the element 610 including the drop shadow 611. Alternatively, if the drop shadow attribute is excluded from the determination of element position as in the second element 620, then the top-left, top-right, bottom-left and bottom-right positions of the element 620a, 620b, 620c, 620d respectively will be determined from the shape of the element 620 excluding the drop shadow 621.

Turning to FIGS. 7A through 7H, several examples of how the next element in focus is determined in response to an instruction to move down to the next focusable element are illustrated. In these figures, the initial or current element in focus in the content 700 is the element 702 (button "A").

Current focus is depicted in these figures by the broken box 705, although as noted above focus may be shown in the communication device display 110 in various ways according to the attributes defined for the element, or may not be shown at all. Other elements shown in the content 700 include the element 704 (button "B"), element 706 (button "C"). In FIGS. 7C, 7D, and 7E, additional element 708 (button "D") is shown, and in FIG. 7E a further element 710 (button "E") is also shown. In each of these figures, the top level of each element—that is to say, the top-left and top-righty value of the element, which will be understood to be equal since element positions are defined as having a rectangular shape—is indicated by a broken line a, b, c, d, or e for ease of reference in the following discussion.

Figure 7A:
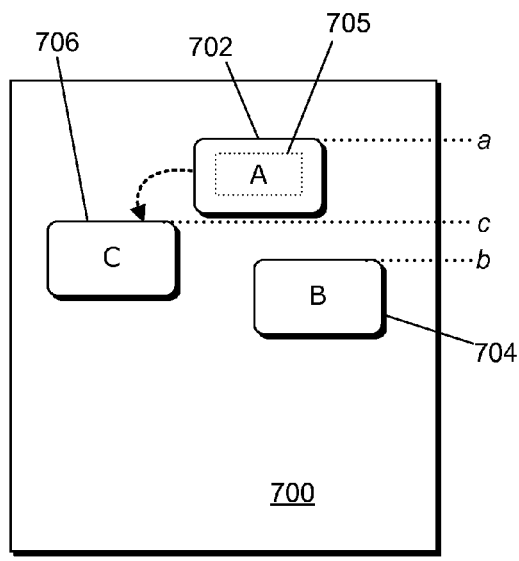
FIGS. 7A to 7H are schematic representations of methods for determining the navigation flow from one element to the next within the content.

In FIG. 7A, in response to the instruction, focus moves from the current element in focus 702 to the element with the next highest top-left y value that is equal to or greater than the top-left y value of the current element in focus 702. Thus, in FIG. 7A, focus moves to the third element 706, even though it is positioned to the left of the current element in focus 7A. It can be seen that the third element 706 is higher (i.e., has a lower top-left y value) than the second element 704, and is thus positioned vertically closer to the current element 702 than the second element 704 is to the current element 702.

Figure 7B:
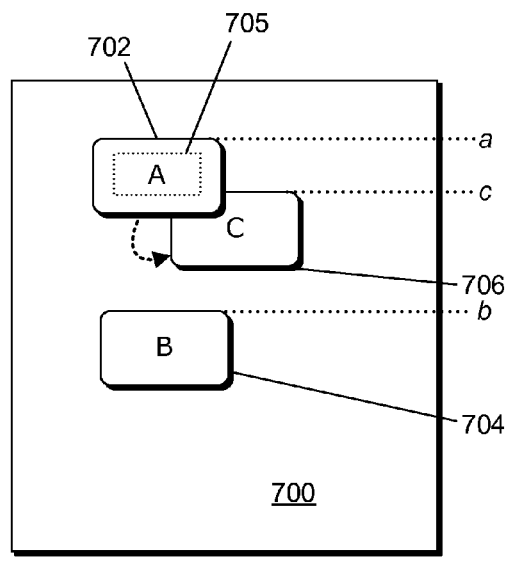
Figure 7C:
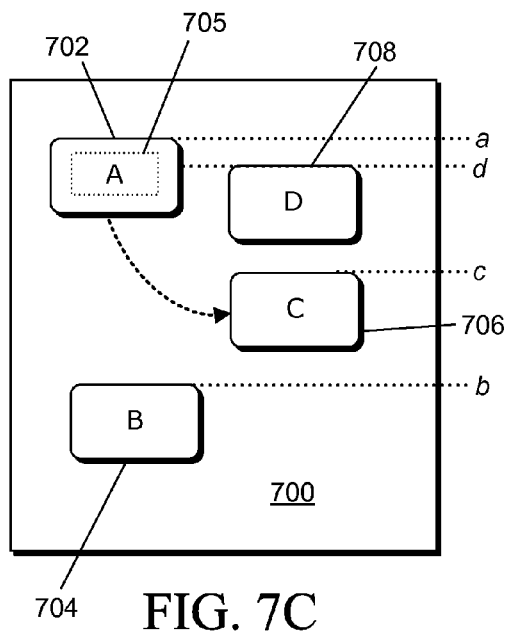
Figure 7D:
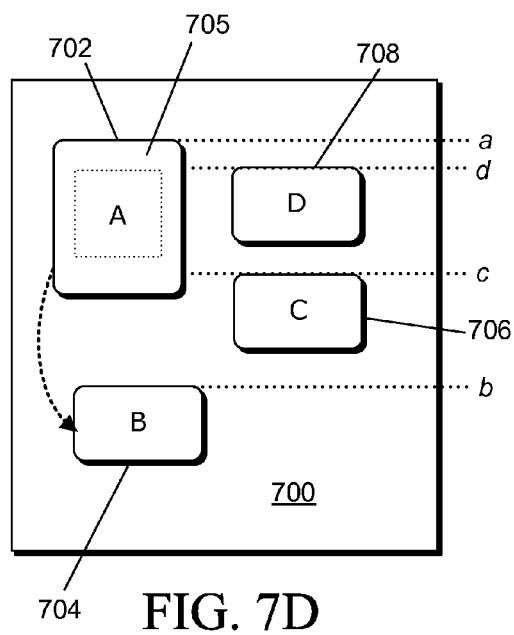
Figure 7E:
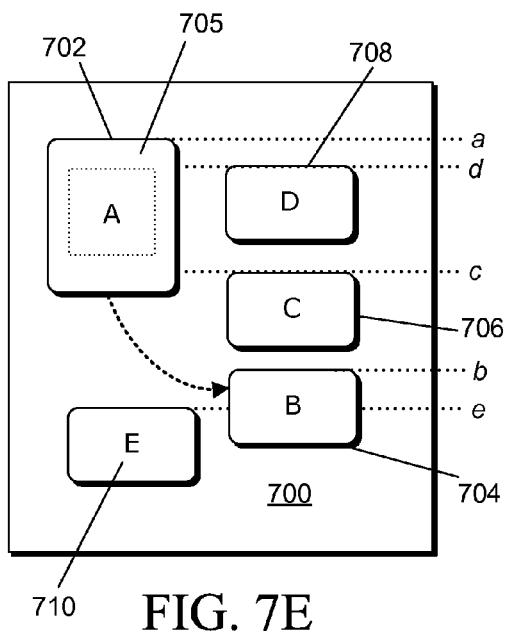

Similarly, in FIG. 7B, focus moves from the current element in focus 702 to the third element 706, even though the third element 706 may be considered to be around the same horizontal level as the current element 702, because the third element 706 overlaps the position of the current element 702. Overlap may be defined as a subsequent element having a top-left y value that is greater than the top-left y value but less than the bottom-left y value of the current element, and having a top-left x value that is greater than the top-left x value but less than the top-right x value of the current element. Because the current element 702 and the third element 706 overlap, the user may perceive the third element 706 as being lower than the current element 702, and thus the likeliest next element to be in focus as a result of an instruction to move the focus down to the next element.

By contrast, in FIG. 7C, focus moves from the current element 702 to the third element 706, bypassing the fourth element 708, which in fact is positioned higher than the third element 706. It can be seen that the fourth element 708 has a top-left y value that is greater than the top-left y value of the current element in focus 702 but less than the top-left y value of the third element 706, meaning that it is vertically closer to the current element in focus 702 than the third element 706 is to the current element 702. Additionally, the top-left y value of the fourth element 708 is greater than the top-left y value but less than the bottom-left y value of the current element 702, meaning that a portion of each occupies the same vertical range in the displayed content 700. However, unlike the example of FIG. 7B, there is no overlap; the fourth element 708 is horizontally displaced from the current element 702, since the top-left x value of the fourth element 708 is greater than the top-right x value of the current element 702. Because a portion of each of the elements 702, 708 occupy the same vertical range while the element 708 is horizontally displaced from the current element 702, the user may perceive the fourth element 708 as being positioned in the same general horizontal level as the current element 702, but not positioned below the current element 702 such that an instruction to move the focus down from the current element 702 should cause the focus to move to the fourth element 708. Accordingly, the focus passes to the third element 706, which is the next-highest element in the content 700 (i.e., it is the focusable element with the next smallest top-left y value).

FIG. 7D shows another example where there is no overlap of elements, but it can be seen that at least a portion of each of the third and fourth elements 706, 708 occupy at least a same vertical range as the current element in focus 702, as the top-left y values of both the third and fourth elements 706, 708 as indicated by lines c and d, respectively, are greater than the top-left y value but less than the bottom-left y value of the current element 702. In this example, for the same reasons as in FIG. 7C, focus moves to the second element 704 in response to an instruction to move focus from the current element 702 down to the next element.

A variant of this is shown in FIG. 7E, having the current element 702 and the third and fourth elements 706, 708 in substantially the same relative positions in the content 700, while the second element 704 is now located beneath the third element 706, such that the top-left y value of the second element is greater than the bottom-left y value of the current, third, and fourth elements 702, 706, 708 respectively. A fifth element 710 is positioned such that its top-left y value is between the top-left and bottom-left y values of the second element 704. In this example, in response to an instruction to move focus from the current element 702 down to the next element, focus passes to the second element 704, for similar reasons as above.

Figure 7F:
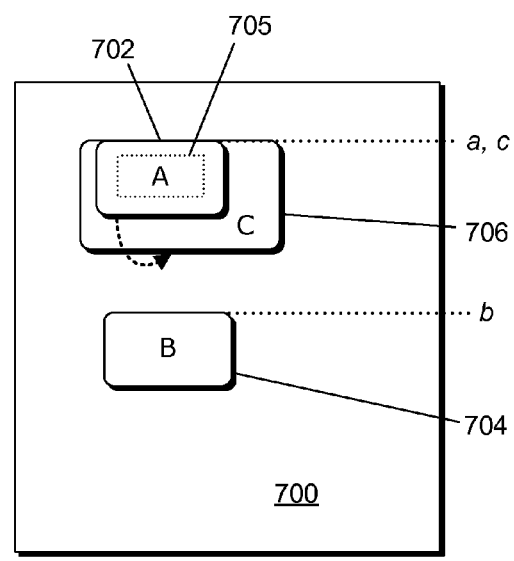

FIG. 7F provides an example in which one element is completely overlapped by another. The current element in focus 702 has a top-left y value equal to the third element 706, but a top-left and top-right x value and a bottom-left y value less than the corresponding values of the third element 706. As with the example of FIG. 7B, in response to an instruction to move focus from the current element 702 down to the next element, focus passes to the third element 706; despite its similar vertical position in the content 700, it may still be perceived by the user as being located lower than the current element in focus 702 because it and the current element 702 overlap, and the bottom-left y value of the third element 706 is greater than the corresponding value of the current element 702.

Figure 7G:
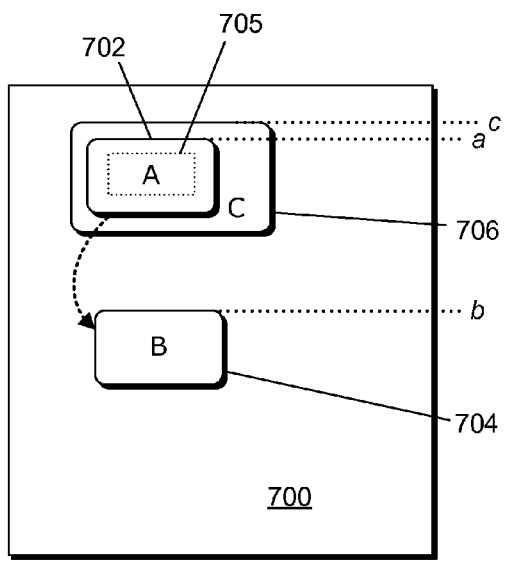
Figure 7H:
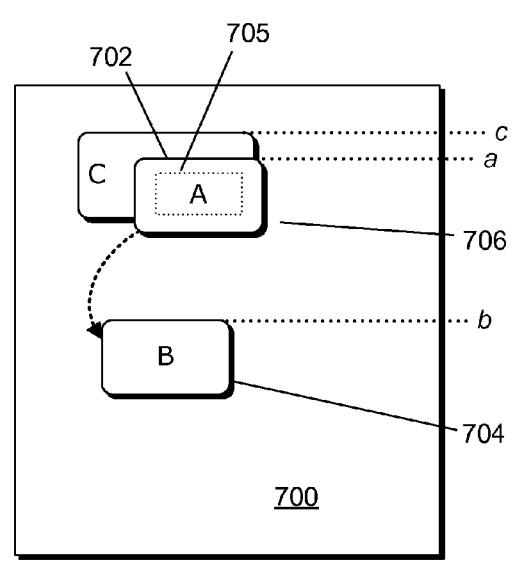

In FIG. 7G, however, the relative positions of the current element in focus 702 and the third element 706 are slightly altered such that focus will pass to the second element 704 from the current element in focus 702. In this case, the top-left y value of the third element 706 is less than the corresponding value of the current element 702. Accordingly, the third element 706 is perceived to be positioned higher in the content 700, even though the lower part of the third element 706 extends below the lowest point of the current element 702. The user thus likely views the second element 704 as being the next element down from the current element in focus 702.

Finally, in FIG. 7H, there is again overlap between the current element in focus 702 and the third element 706, although now the bottom-left y value of the third element 706 is less than the bottom-left y value of the current element 702. For a similar reason as for FIG. 7G, the user likely views the second element 704 as the next element down from the current element in focus 702, so in response to the instruction to move focus down to the next element, the focus passes to the second element 704.

Figure 8:
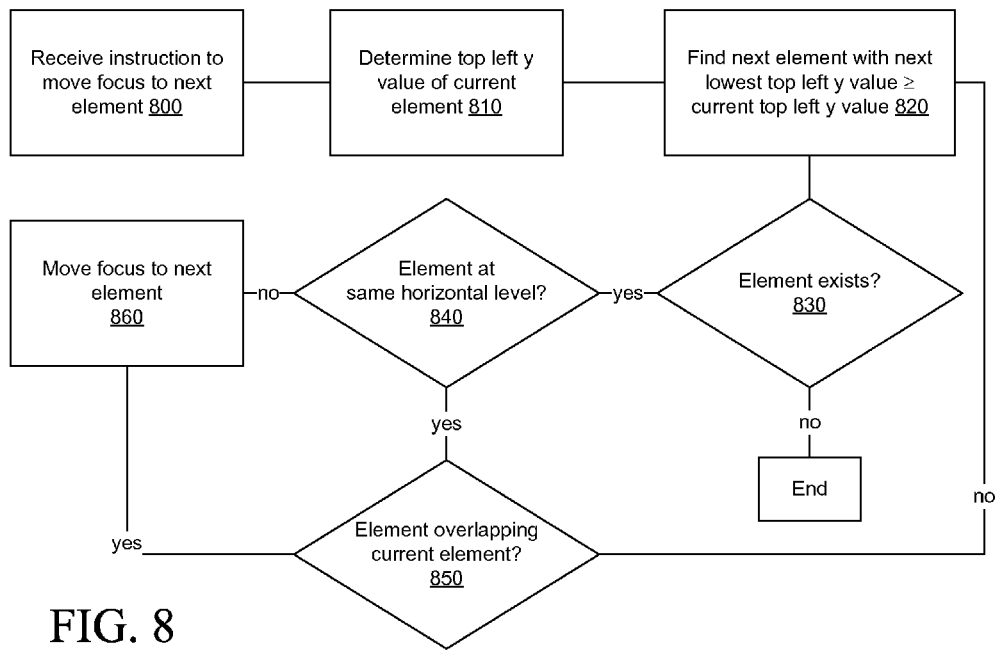
FIG. 8 is a flowchart illustrating a method for determining the navigation flow from one element to the next within the content.
Figure 9:
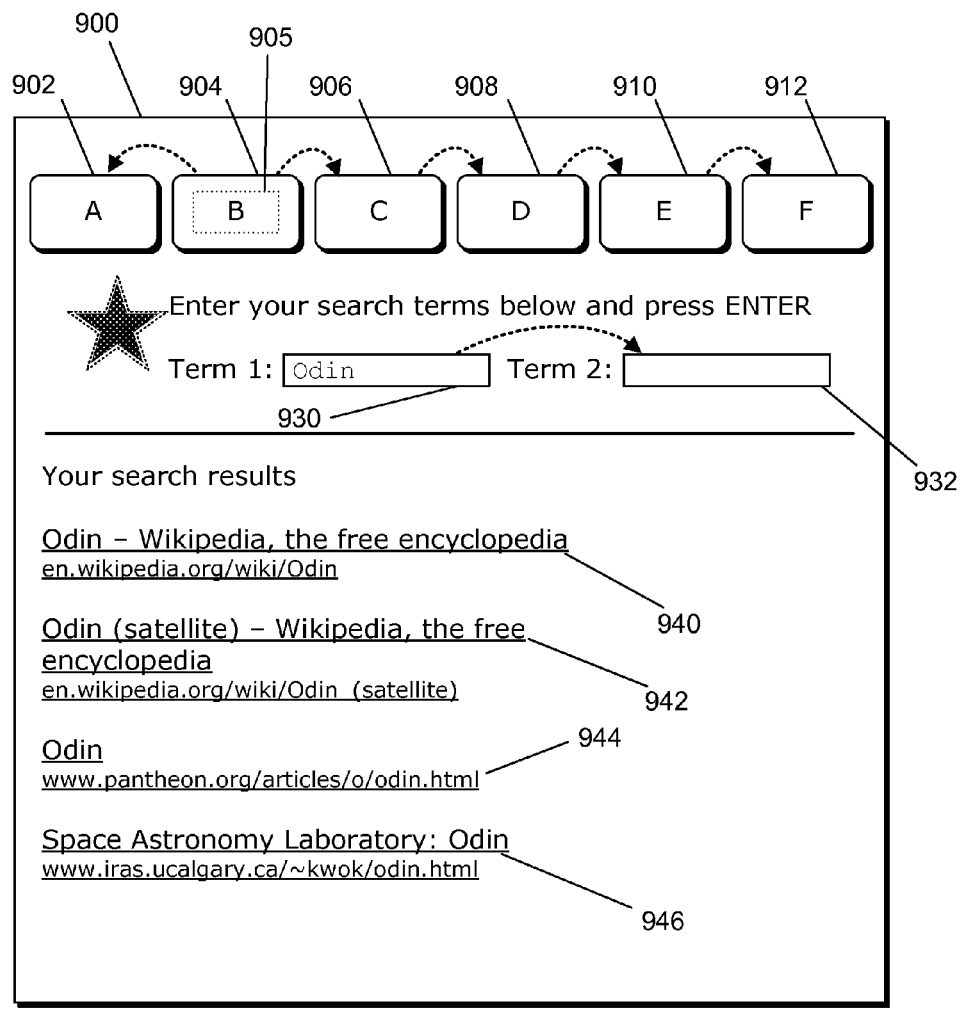
FIG. 9 is a further example of content comprising a number of navigable elements.

A method for determining the next element to which focus should pass in response to an instruction to move focus down from a current element in focus is shown in FIG. 8. At 800, an instruction to move focus down to the next element is received. The upper y value or upper bound value (e.g., the top-left y value) of the current element in focus is determined at 810 so as to determine the next element displayed in the content having the lowest upper y value or lowest upper bound value (again, such as the lowest top-left y value) that is equal to or greater than the upper y value of the current element at 820, as these values increase downwards, which in this case is the direction of desired navigation. If such an element is determined not to exist at 830, then the process ends and the focus does not move from the current element. If such an element does exist, then it is determined whether this next element is at the same horizontal level as the current element in focus at 840. The next element is as the same horizontal level as the current element in focus if its upper y value or upper bound value is equal to or less than the lower y value or lower bound value (such as the bottom-left y value) of the current element. If the next element is not at the same horizontal level, then the focus is moved to that next element at 860. If the next element is determined to be at the same horizontal level at 840, then it is determined whether the next element overlaps the current element at 850. An explanation of an overlapping element is given above. If the next element does overlap the current element, then the focus is moved to that next element at 860. If it does not overlap, then the process returns to step 820 where the next element having the next lowest upper y value equal to or grater than the upper y value of the current element is found.

It will be appreciated by those skilled in the art that the steps shown in FIG. 8 may occur in different orders; for example, all elements having upper y values or upper bound values equal to or greater than the upper y value of the element currently in focus may be located first, and then additional steps carried out to determine which of these elements is the next element to receive focus in response to an instruction to move focus down to the next element. It will also be appreciated that a similar process may be followed in response to a command to move the focus upwards from an element currently in focus, by reversing the various criteria applied at each step. For example, a lower bound value of the current element in focus is determined, and rather than comparing the upper y values of the current element in focus and the prospective next element, the lower y values or lower bound values (e.g., the bottom-left y values) of these elements are compared to determine whether a prospective next element is located at the same horizontal level or above the current element. The next element would be at the same horizontal level if its lower bound value is equal to or greater than the upper bound value of the current element in focus. If the next element is not at the same horizontal level, then the focus is moved to that next element. If the next element is determined to be at the same horizontal level, then it is determined whether the next element overlaps the current element. The next element would overlap the current element if the next element has a rightmost bound value that is greater than the leftmost bound of the current element but less than the rightmost bound of the current element. If the next element overlaps the current element in that case, then the focus is moved to the next element. Variations of the process and steps of FIG. 8 are within the abilities of persons of ordinary skill in the art. For example, the orientation of the x and y axes may be rotated and/or reflected to more accurately reflect the direction of increasing or decreasing paragraph or line order in another language.

Navigation or traversal of a page in response to commands to move the focus to the right (in a typical direction of reading a line of text in a language such as English) or left may follow a different process than that provided for vertical navigation (i.e., a direction of reading associated with increasing or decreasing paragraph or line order). The instruction to move the focus to the right may be received through user actuation of an input subsystem 112 such as a gesture towards the right on a touchpad, touchscreen, trackball, or the like, or by depressing a designated key on a keyboard, such as the right arrow key. Turning to FIG. 9, content 900 that may be displayed and navigated using a client application is shown. The content 900 includes a series of elements 902 through 912, illustrated here as a series of buttons, where the second element 904 is currently in focus, as indicated by the broken box 905. First and second text input boxes 930 and 932 are also provided. A set of hyperlinks 940 through 946 is also shown in the content 900 below the two text input boxes 930, 932. When an instruction to move the focus to the left of the currently focused element 904 is received, the focus may follow the direction that is likely expected by the reader, that is to the next element to the left 902. When an instruction to move the focus to the right of the currently focused element 904 is received, the focus may therefore move to the third element 906, then as the instruction is repeated, to the following elements 908, 910, and 912. It can be seen that this follows the typical Western direction of reading from left to right. Once the sixth element 912 is in focus, however, further receipt of instructions to move the focus right to the next focusable element will not result in a change in focus, because the right-most element on that horizontal level is already in focus.

Similarly, when the first text input box 930 is in focus, receipt of an instruction to move the focus to the next element to the right will move the focus to the next text input box 932. However, once the focus is on that second text input box 932, a further instruction to move the focus to the next element to the right will result in no change, since the rightmost element on that horizontal level is already in focus. The focus will not move to the hyperlinks 940 to 946.

Figure 10A:
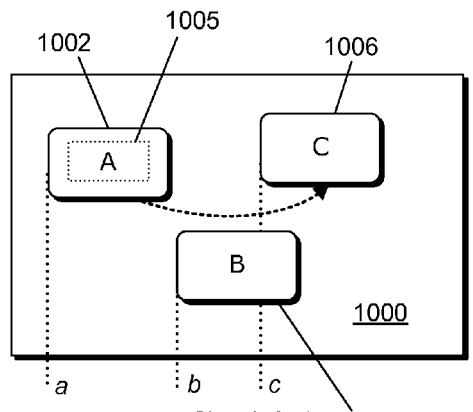
FIGS. 10A to 10F are further schematic representations of methods for determining the navigation flow from one element to the next within the content.

FIGS. 10A through 10F illustrate further cases in which an instruction to move focus right to the next focusable element is received. Each of these figures shows content 1000 having first, second and third elements 1002, 1004, and 1006 respectively, where the first element 1002 is shown to be in focus as indicated by the broken box 1005. The leftmost edge or bound of each element, for example as defined by the value of the top-left x value for each element, is shown by broken lines a, b, and c for ease of reference. In FIG. 10A, the second element 1004 is positioned such that its top-left x value or leftmost bound value is greater than the rightmost edge or rightmost bound value of the current element in focus 1002, and the third element 1006 is positioned such that its top-left x value is greater than the top-left x value of the second element 1004. Thus, the second element 1004 is positioned closer along the x axis to the current element in focus 1002 than the third element 1006 is to the current element 1002. However, in FIG. 10A, focus moves from the current element 1002 to the third element 1006 in response to an instruction to move the focus right to the next element. This is because the third element 1006 is positioned at about the same horizontal level as the current element in focus 1002; it can be seen, for example, that a portion of each of the current element 1002 and the third element 1006 occupies the same vertical range in the content 1000.

Figure 10B:
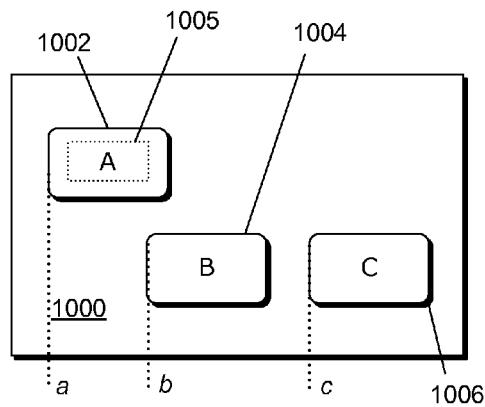

In FIG. 10B, both the second and third elements 1004, 1006 are positioned at the same horizontal level, but both are positioned such that their uppermost edges are below the lower edge of the current element in focus 1002 (i.e., the top-left y value of each is greater than the bottom-left y value of the current element 1002). Accordingly, the focus will not change in response to an instruction to move the focus right to the next element.

Figure 10C:
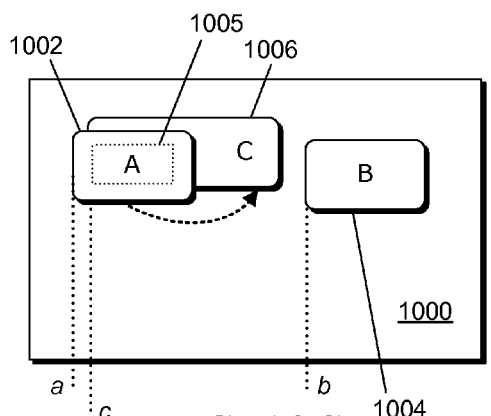
Figure 10D:
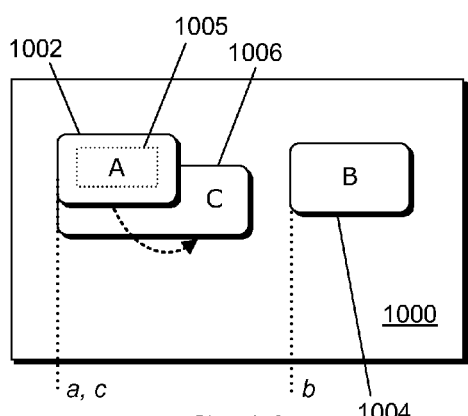

In FIG. 10C, the third element 1006 overlaps the current element in focus 1002, such that at least a portion of each of the third element 1006 and the current element 1002 occupy the same vertical range in the content 1000 and the top-left x value of the third element 1006 is greater than the top-left x value but less than the top-right x value of the current element in focus 1002, while the rightmost bound of the third element 1006 extends beyond the rightmost bound of the current element 1002. In this example, in response to an instruction to move the focus right to the next element, the focus will move from the current element 1002 to the third element 1006 because it is at the same horizontal level, and also considered to be positioned to the right of the current element in focus 1002. This movement would likely coincide with the user's expectation of where focus would move in response to an instruction to move to the right.

Similarly, in FIG. 10D, focus again moves from the current element in focus 1002 to the third element 1006 in response to an instruction to move the focus right to the next element. Although both the current element 1002 and the third element 1006 have the same top-left x value, the third element 1006 extends beyond the rightmost bound of the current element 1002, and would be perceived by the user to again be the next element to the right of the current element in focus 1002.

Figure 10E:
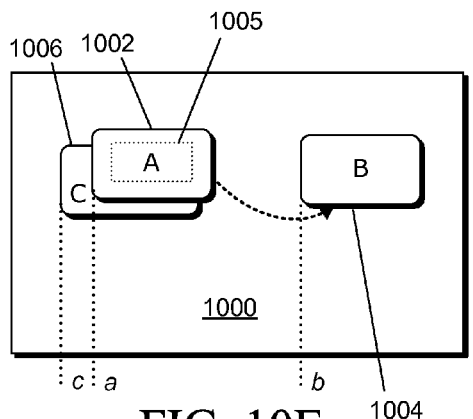
Figure 10F:
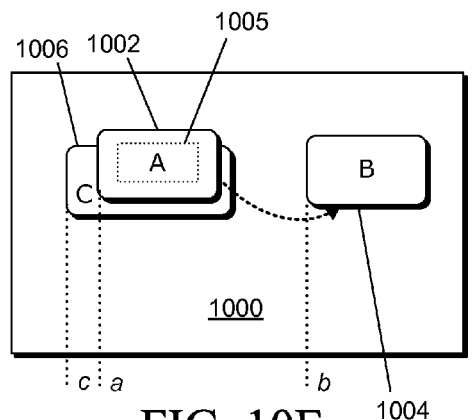

By contrast, in FIG. 10E, the top-left x value of the third element 1006 is now less than the top-left x value of the current element in focus 1002, and the rightmost edge of the third element 1006 does not extend beyond the rightmost edge of the current element 1002. To the user, the second element 1004 is perceived to be the next element to the right of the current element in focus 1002. Accordingly, in response to an instruction to move the focus right to the next element, the focus will move from the current element 1002 to the second element 1004. Finally, in FIG. 10F, the three elements are positioned in approximately the same manner as in FIG. 10E, except the third element 1006 extends beyond the leftmost and rightmost bounds of the current element in focus 1002. Again, the focus moves from the current element 1002 to the second element 1004 in response to an instruction to move the focus right to the next element, because the third element 1006, although its top-right x value may be greater than the top-right x value of the current element 1002, is considered to be positioned to the left of the current element 1002 because its top-left x value is less than the corresponding value of the current element 1002.

The process by which the next element is identified for the examples of FIGS. 10A through 10F is illustrated in FIG. 11. At step 1100, an instruction to move focus right to the next element is received. The leftmost bound value of the current element in focus is determined at 1110, for example by determining its top-left x value. Then, the element with the next lowest leftmost bound value or lowest top-left x value that is equal to or greater than the leftmost bound value or top-left x value of the current element is identified at 1120. If this next element is determined not to exist at 1130, then the process ends and the focus does not move. If this next element is determined to exist, then it is next determined whether it is positioned at the same horizontal level as the current element 1140. As explained above, an element is considered to be positioned at the same horizontal level if at least a portion of the element is positioned in the same vertical range as at least a portion of the current element. If the element is not positioned at the same horizontal level, the process returns to 1120 and the next potential element is identified. If the element is positioned at the same horizontal level, it is then determined at 1150 whether the element's top-right x value or rightmost bound value is greater than the current element's corresponding value (i.e., whether the rightmost bound of the next element extends to the right of the rightmost bound of the current element). If not, the process returns to 1120. If so, then the focus is moved to this element at 1160.

Again, it will be appreciated by those skilled in the art that the steps shown in FIG. 11 may occur in different orders and that furthermore, a similar process may be followed in response to a command to move the focus left (i.e., in a reverse direction of reading a typical line of text in the English language) from an element currently in focus, by reversing the various criteria applied at each step. For example, a rightmost bound value of the current element in focus would be determined, and rather than comparing the leftmost x values of the current element in focus and the prospective next element, the rightmost x values or rightmost bound values (e.g., the top-right x values) may be compared to determine whether a prospective next element is located to the left of the current element. If the prospective next element is located to the left of the current element, and it is at the same horizontal level as explained above, and if it is determined to extend to the left of the current element (i.e., the next element's leftmost bound value is less than the leftmost bound value of the current element), then the focus is moved to that next element.

Variations of the process and steps of FIG. 11 are within the abilities of persons of ordinary skill in the art. Again, the orientation x and y axes referred to above may be rotated and/or reflected to more accurately reflect the direction of reading of a line of text in a given language. While many readers of languages that are printed and read in directions other than those used in languages such as English may have become acclimatized to using graphical user interfaces designed for reading in such a Western-style direction, it may be desirable to provide the user with a user interface experience resembling their experience with other media. Accordingly, the process of identifying a next element to receive focus from a current element may be described in more general terms, with reference to FIG. 15.

Figure 15:
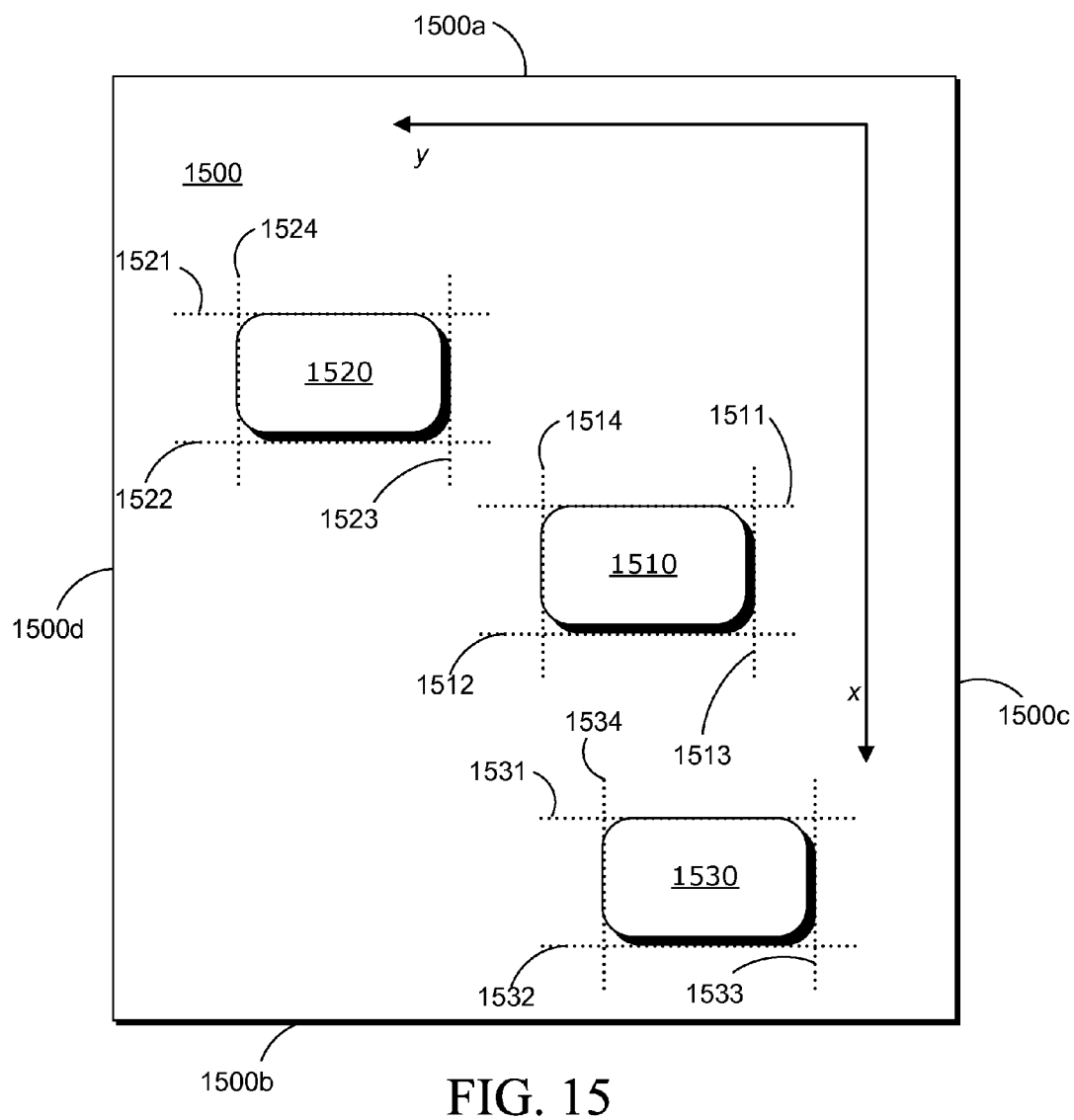
FIG. 15 is a further schematic representation of elements within content presented in a display.

FIG. 15 illustrates a graphical user interface comprising content 1500, such as a first element 1510, a second element 1520, and a third element 1530. In this example, it is presumed that the user is accustomed to reading text within a single line from top to bottom (indicated by the direction of the x axis in FIG. 15), and from one line to the next from right to left (indicated by the direction of the y axis). Other text reading directions of lines of text, and series of lines of text, may also be used; the embodiment described in connection with FIG. 15 is not intended to be limited to the top-to-bottom, right-to-left reading directions illustrated therein.

In the example of FIG. 15, where the English reader might navigate "down" a display (in the example of FIG. 15, this may be from the top 1500a to the bottom 1500b of the content 1500), the analogous direction to another user accustomed to a different reading orientation may be what the English reader would interpret as "across" the display (in the example of FIG. 15, from right 1500c to left 1500d of the content 1500). It will be noted from the discussion of navigation with reference to FIGS. 6 to 11 that the method for determining the next element to receive focus in response to an instruction to move the focus in a direction parallel to a given axis varies, according to the orientation of the axis. In this example of FIG. 15, the methods will likewise vary according to the orientation of the axis. The methods are described with reference to FIGS. 15, 16 and 17.

Figure 16:
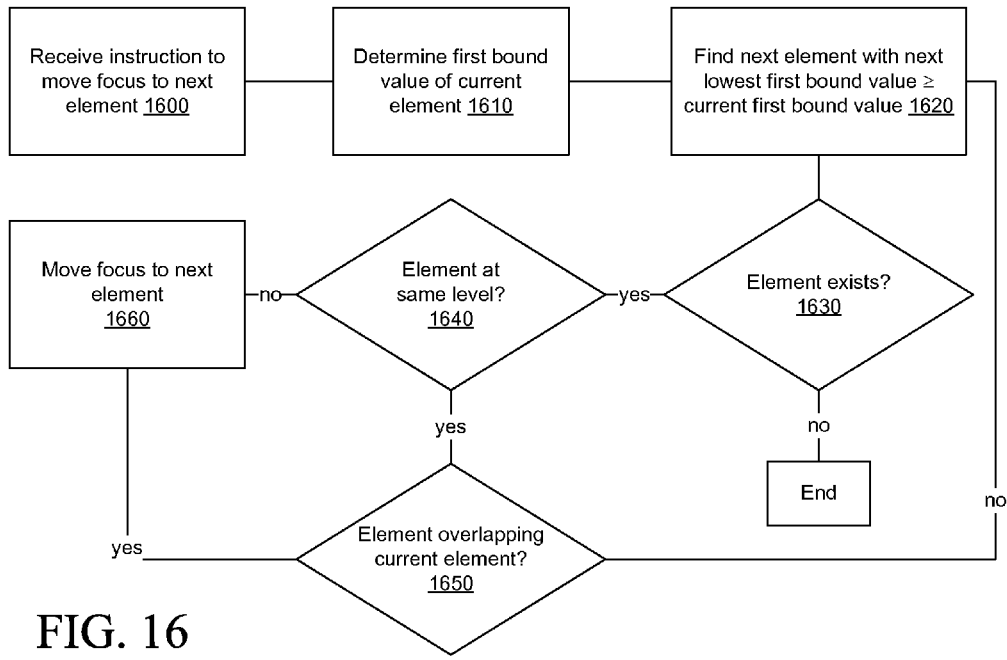
FIG. 16 is a flowchart illustrating a method for determining the navigation flow from one element to the next within the content of FIG. 15.

If the first element 1510 is the current element having focus, and an instruction is received to move the focus in the general direction or axis coinciding with a direction of reading subsequent lines of content, i.e. from one line to the next, as indicated by block 1600 of FIG. 16, a first bound value of the current element 1510 corresponding to a first edge is determined at 1610. Each edge 1511, 1512, 1513, 1514 of the first element 1510 defines an edge or boundary of the element 1510 in the display of the communication device 100. If each element is defined as a generally rectangular area, the edges 1511, 1512, 1513, 1514 may be defined as the edges of the element 1510 that are generally perpendicular to an axis of the display. In this example, the edges 1511 and 1512 are generally perpendicular to the x axis; they are the edges that are generally perpendicular to a user's direction of reading from a line of text. If a value is assigned to each of the edges according to the corresponding perpendicular axis, where values increase in the usual direction of reading, then the edge 1511 will have a lower value attributed to it than the edge 1512. Similarly, the edges 1513, 1514 are generally perpendicular to the y axis in FIG. 15, and the edge 1513 will have a lower value attributed to it than the edge 1514, measured against they axis in the usual direction of reading. Thus, the first bound value of the current element 1510 that is determined at block 1610 of FIG. 16 is the lower of the two values corresponding to the two edges generally perpendicular to the y axis, which is the axis generally parallel to the direction of motion received in the instruction. In FIG. 15, the first bound value will be the value accorded to the edge 1513.

At block 1620 of FIG. 16, a next element is identified having the next lowest first bound value that is greater or equal to the first bound value of the current element 1510. In the example of FIG. 15, the second element 1520 has edges 1521, 1522, 1523, 1524 defined in the same manner as that described above for the current element in focus 1510. The second element 1520 has a first bound value defined in the same manner as that described above. Thus, the first bound value is the value associated with the edge 1523. The first bound value of the element 1520 will be greater than the first bound value of the current element 1510, having reference to the y axis, which represents increasing values in the user's typical direction of reading. If this is the next lowest first bound value associated with any other element shown in the content 1500, then the next element is determined to exist at block 1630. Had no such element been identified, the process would end, and the focus would not move to another element.

Since the next element 1520 does exist, it is then determined whether the next element 1520 is at the same level as the current element 1510 at block 1640. The two elements 1510, 1520 are determined to be at the same level if they would be generally located on the same line of text. In other words, they would be at the same level if the first and second element 1510, 1520 occupy at least a portion of the same range along the y axis (i.e., they occupy at least a portion of the same range along the axis defining the direction of reading from line to line). This would be the case if the first bound value of the second element 1520 is equal to or less than a second bound value of the first element 1510, where the second bound value is the value of the edge 1514. The edge 1514 is the other of the two edges generally perpendicular to the y axis. In the example of FIG. 15, the current element 1510 and the second element 1520 are not at the same level. Therefore, the focus moves to the next element 1520 at block 1660 of FIG. 16, and the process ends.

Were the current element 1510 and the next element 1520 at the same level, then it would be determined at block 1650 of FIG. 16 whether the next element 1520 overlapped the current element 1610. Overlapping elements not only occupy at least a portion of the same range along they axis (i.e., at least a portion of the same range along the axis defining the direction of reading from line to line), but also at least a portion of the same range along the remaining axis, here the x axis. This may be determined, for example, by comparing the position of at least some of the edges 1511, 1512 of the current element 1510 with the edges 1521 and 1522 of the next element 1520. For example, if the edge 1522 of the second element 1520 were interposed between the edges 1511, 1512 of the current element 1510, such that the corresponding x value of the edge 1522 was between the corresponding values of the edges 1511, 1512, there would be overlap along the x axis. If it is determined that the elements overlap, then focus moves to the next element 1520 at block 1660. Otherwise, the process returns to block 1620.

Figure 17:
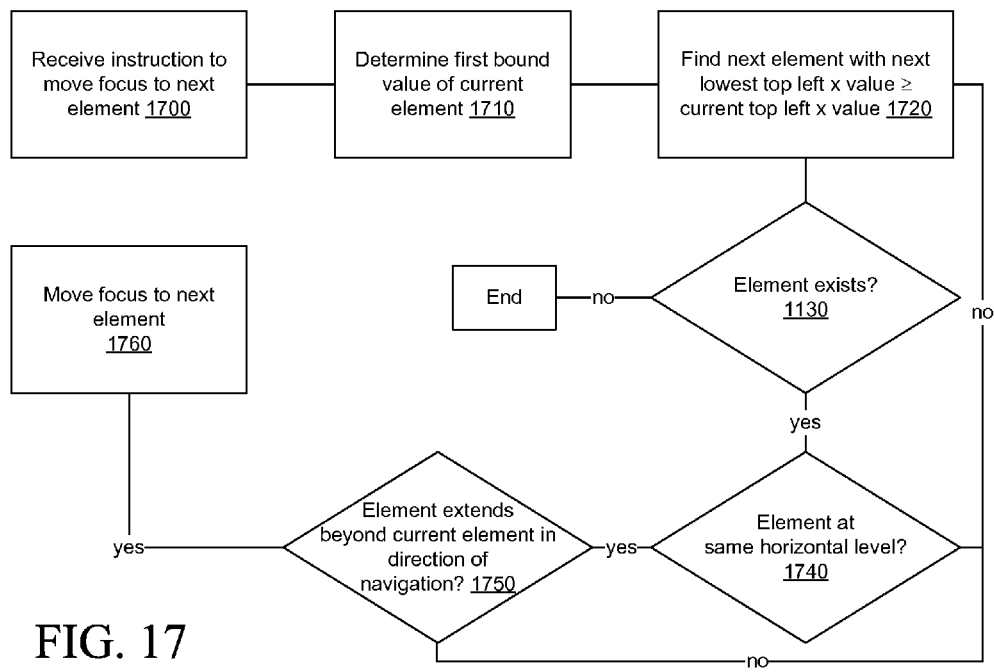
FIG. 17 is a flowchart illustrating a further method for determining the navigation flow from one element to the next within the content of FIG. 15.

Turning to FIG. 17, if the first element 1510 is the current element having focus and an instruction is received to move the focus in the general direction or axis coinciding with a direction of reading from a single line of content or text as indicated by block 1700 of FIG. 17, a further first bound value of the current element 1510 corresponding to a first edge is determined at 1710. However, as the direction of navigation generally corresponds to the direction of reading a line of text, the first bound value will be the lower of the two values corresponding to the two edges of the current element 1510 generally perpendicular to the x axis, which is the axis generally parallel to the direction of motion received in the instruction at 1700. Thus, in FIG. 15, the further first bound value in this case will be the value associated with the edge 1511, given increasing x values in the usual direction of reading.

Once the further first bound value id determined, a next element is identified as having the next lowest further first bound value that is greater than or equal to the further first bound value of the current element 1510. In the example of FIG. 15, the third element 1530 has edges 1531, 1532, 1533, 1534 defined in the same manner as that described above for the current element in focus 1510. The third element 1530's corresponding further first bound value is associated with the edge 1531. If this is the next lowest first bound value associated with any other element shown in the content 1500, then the next element is determined to exist at block 1730. Had no such element been identified, the process would end, and the focus would not move to another element.

Since the next element 1530 does exist, it is then determined whether the next element 1530 is at the same level as the current element 1510 at block 1740. The definition of "same level" is defined above with respect to the method of FIG. 16. Two elements are determined to be at the same level if they would be generally located on the same line of text, according to the definition above. If the elements 1510, 1530 are not at the same level, then it is determined that it is not the next element that should gain focus from the current element, given the direction of navigation comprised in the instruction. Therefore, the process returns to block 1720, and a further next element, if any, is identified.

If the element 1530 is found to be in the same level, it is then determined whether the element 1530 extends beyond the current element 1510 in the general direction of navigation received in the instruction at block 1750 of FIG. 17. Given the axes defined in FIG. 15, in which value increases in the typical direction of reading, the element 1530 will be found to extend beyond the current element 1510 if a second bound value of the element 1530 is greater than a corresponding second bound value of the current element 1510. The second bound value of either element 1510, 1530 is the greater of the two values corresponding to the two edges of the element generally perpendicular to the axis in the direction of navigation, or the x axis. In other words, the element 1530 will be found to extend beyond the current element 1510 in the direction of navigation if the x value associated with the edge 1532 is greater than the x value associated with the edge 1512. In the example of FIG. 15, this is the case, and therefore focus is moved to the element 1530 at block 1760. If it were not the case, then the process would return again to block 1720.

It will be appreciated by those skilled in the art that the steps shown in FIGS. 16 and 17 may occur in different orders, and that similar processes may be followed in response to instructions to move focus in the reverse directions, by reversing the various criteria applied at each step.

The foregoing examples represent a possible default mode or predetermined order of navigation in a client application displaying structured content having focusable elements. By configuring the navigation or traversal of the content in accordance with the cases described above, navigation within the client application responds in a manner that is more likely to reflect the typical user's expectation of where focus should move in response to a directional instruction (e.g., up, down, right, left) to move the focus. The content may extend beyond the viewable area of the display 110 of the communication device 100 such that at least one portion of the content is not viewable on the display 110, and that portion may contain an element that forms part of the navigation path in accordance with the embodiments described above. When the content is traversed and focus is shifted to that element not currently viewable on the display 110, the client application may cause the display 110 to "scroll" down to that element, so that element and portion of the content will become viewable.

However, in some circumstances, it may be desirable to override this default behaviour. It is sometimes desirable to disable navigation from certain elements, or to prevent an element in the content from being focusable. It may furthermore be desirable to redirect navigation in a direction other than described above. For example, referring back to the content 500 shown in FIG. 5B, it may be more logical to the typical user that if one of elements 510 or 512 is in focus, that in response to an instruction to move the focus downwards the focus should pass to the first text input box 530 rather than the second text input box 532, because the user's next action would likely be to enter data in the first text input box 530, and not the second. Or, a user's next action may depend on the state of other elements in the content. For example, in FIG. 9, it may be determined that a user who has entered a search term in at least one of the text input boxes 920, 932 typically wishes to actuate one of the elements 902 through 912 after viewing the search results (i.e., the hyperlinks 940 through 946) displayed in the lower portion of the content 900. Therefore, if the first hyperlink 940 is currently in focus, if data has been entered in the first text input box, then in response to an instruction to move the focus upwards, it may be desirable to move the focus up to the first element 902 rather than back to the first text input box 920, even if the first text input box 920 is vertically the closest element to the first hyperlink element 940. It may also be desirable to create a focus on an element within the content that is not normally focusable, such as text that is not demarcated by an anchor (<a>) tag in an HTML document.

Thus, in a further embodiment, the client application may be configured to display content in which elements that are focusable by default (such as <textarea>, <a>, <input>, <select>, and <button> in an HTML document) are rendered non-focusable. This may be achieved by setting a value for an attribute associated with the element, such that the attribute is applied by the client application to the element when the content is rendered for display to the user. For example, in content comprising HTML-type markup, an anchor element is normally focusable and defined as follows:

<a name="anchor_tag 1">Sample Anchor Tag</a>

This element may be rendered non-focusable by declaring an attribute of the element specifically relating to focusability, for example:

<a name="anchor_tag 1" x-focusable="true">Sample Anchor Tag</a>

<a name="anchor_tag 1" x-focusable="false">Sample Anchor Tag</a>

The attribute "x-focusable" may, of course, have a different name. In this example, the attribute "x-focusable" may take on the value "true" or "false", where "true" means that the element within the markup tag is focusable, and "false" means that the element is not focusable. Thus, when an element is by default focusable and the attribute is set to "false", the attribute value overrides the default behaviour of the element and the element, when rendered in the browser or other viewing application, will not be capable of gaining focus. If the same element that is by default focusable has the "x-focusable" attribute set to "true", there will be no change in the behaviour of the element, since the element was already focusable.

It will be appreciated that an attribute such as "x-focusable" may be applied to elements that are not normally focusable. When the element is by default not focusable and the "x-focusable" attribute is set to "false", there will be no change in the behaviour of the element, since the element was not initially focusable. If the element is by default not focusable and the "x-focusable" attribute is set to "true", then the element effectively behaves in a manner similar to other enabled, focusable elements, in that the element is now capable of gaining focus as a result of navigation. Thus, by setting this attribute to "true" for a previously non-focusable element, the element may now form part of the navigation of the content.

The focusable attribute is distinct from an attribute setting the element as either "enabled" or "disabled". As explained above, an enabled element is one that is capable of gaining focus or selectable as well as and actuatable, and is normally included in the navigation order when the user navigates or traverses through the content. A disabled element is an element that is capable of being enabled, but is in a non-enabled state, such that it is not capable of gaining focus, cannot be selected or actuated, and is excluded from the navigation order.

By contrast, the focusable attribute described above may be applied not only to enableable elements which are capable of being enabled or disabled, but also to other elements that are not capable of being enabled or disabled at all; that is to say, non-enableable elements that are otherwise not focusable, including non-interactive elements. When the focusable attribute is declared and set to "true" in association with such a non-enableable element, (for example, by setting the exemplary "x-focusable" attribute to "true") the element does not become "enabled", because it is not capable of being actuated in the way a form element may be actuated. It is now, however, focusable, and included in the navigation order. Thus, it is possible to create content with elements that are not actuable or enabled, yet are capable of gaining focus. This provides the content developer with the opportunity to exercise control over the user's navigation through the content.

Figure 12:
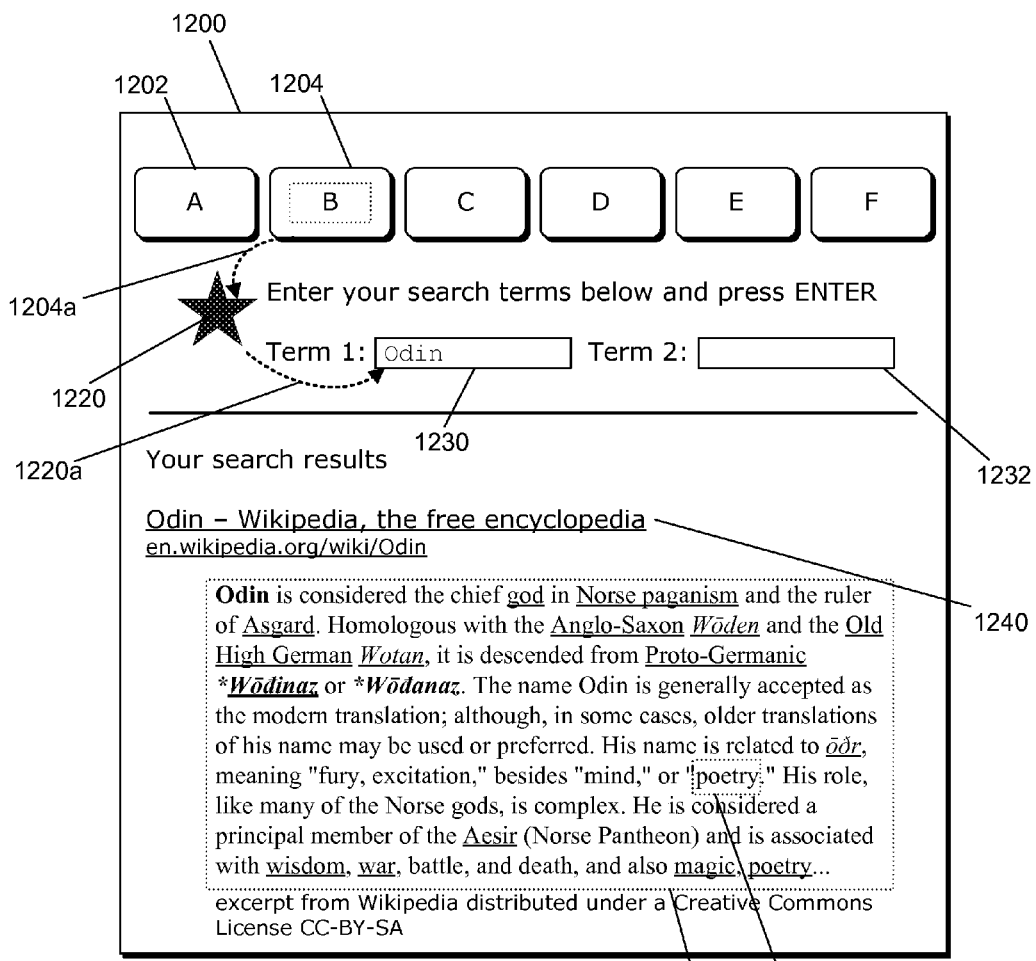
FIG. 12 is another example of a document comprising customized navigable elements.

An example of navigation with additional focusable elements created using the "x-focusable" attribute is shown in FIG. 12. Content 1200 is provided with a number of typically focusable elements, including button elements 1202 through 1212, text input boxes 1230, 1232, and hyperlink 1240. With these normally focusable elements, navigation of focus through the content may take place in the default manner described above.

The image element 1220 shown in FIG. 12 may normally be a non-focusable element that does not form part of the navigation flow in the content 1200. However, by applying the "x-focusable" attribute to the element, for example:
<img name="star" src="star.jpg" x-focusable="true"/>
The image element becomes focusable, and will form part of the navigation flow of the content 1200, in the manner described above. Thus, for example, when the second element 1204 is in focus, on detection of an instruction to move the focus down to the next focusable element, the focus will move to the image element 1220 rather than the text input element 1230, as indicated by arrow 1204*a*. When the image element 1220 is in focus, an instruction to move the focus to the right will move the focus to the first text input element 1230, as indicated by arrow 1220*a*.

An example of other elements that are not normally focusable, but are provided with an attribute rendering them focusable, is also shown in FIG. 12. The attribute may be applied to non-semantic elements such as logical divisions or content segments within a parent element. For example, div element 1250, which contains a paragraph of text, may be defined to be focusable as follows:
<div id="new_paragraph" x-focusable="true"><strong>Odin</strong> is considered the chief . . . </div>

Thus, when the hyperlink element 1240 is in focus and a command is received to move focus down to the next element, the focus may move to this <div> element, since the <div> element has been defined as being focusable.

It can be appreciated that the "x-focusable" attribute may be applied to a number of non-focusable elements, including table, row, and cell elements and text. Furthermore, the attribute may be nested. Within the div element 1250, the single word "poetry" is also set within a span tag defining an inline logical group within the block of text comprised in the div element 1250 with the "x-focusable" attribute set to "true":
<div id="new_paragraph" x-focusable="true"><strong>Odin</strong> is considered the chief . . . meaning "fury, excitation," besides "mind," or "<span id="new_word" x-focusable="true">poetry</span>." His role, like many of the . . . </div>

The span element "poetry" 1252 is thus nested within the div container element 1250 comprising the larger paragraph containing the span element 1252. The span element 1252 thus overlaps the larger <div> element 1250, and is navigable in accordance with the methodology described above. For example, when the hypertext 1240 is in focus and a command is received to move the focus down to the next element, the div element 1250 will then gain focus. If a further command to move the focus down to the next element is received, the focus may then move to the span element 1252. Thus, it can be seen that by defining various elements within the content 1200 as being focusable, finer control can be exercised over the path followed by a user navigating or traversing the content in a client application. By setting attributes of various elements in this manner, a user can be forced to navigate to a specific content area, if the user navigates through the content by following the movement of focus from element to element. Other normally non-enableable elements may be declared focusable in this manner, including, without limitation, HTML elements such as the <div>, <span>, <p> (paragraph), <img> (image), <li> (list item), <ul> (unordered list), <ol> (ordered list), and header elements.

In addition, specific navigation events may be trapped by the client application to further customize navigation or traversal of content. When a specific type of navigation event is detected, an event handling routing may be triggered to carry out a predetermined function. For example, the aforementioned example anchor element:
<a name="anchor_tag 1">Sample Anchor Tag</a>
may be provided with an attribute specifically relating to navigation events, such as:
<a name="anchor_tag 1" x-onNavDown="Function1( )">Sample Anchor Tag</a>
<a name="anchor_tag 1" x-onNavUp="Function2( )">Sample Anchor Tag</a>
<a name="anchor_tag 1" x-onNavLeft="Function3( )">Sample Anchor Tag</a>
<a name="anchor_tag 1" x-onNavRight="Function4( )">Sample Anchor Tag</a>

The attributes "x-onNavDown", "x-onNavUp", "x-onNavLeft" and "x-onNavRight" may be provided with different names, but for ease of reference will be referred to with the foregoing names, which are easily correlated to navigation events. The attribute "x-onNavDown" may correspond to the detected event when the element "anchor_tag_1" is in focus and an instruction is received from a user input subsystem 112 corresponding to a down movement; the remaining attributes would thus correspond to the events corresponding to an upwards movement, a leftwards movement, and a rightwards movement, respectively. When these attributes are applied to an element, the behaviour within the client application may be customized by calling an event handling function using techniques known to those skilled in the art. For example, the event handling function may be defined in a scripting language such as JavaScript. Thus, when "anchor_tag_1" is in focus and an instruction is received corresponding to a down movement, the execution of the function "Function1( )" is triggered, and control within the browser or other application environment will pass to the function. This function could, for example, cause focus to be moved to a different location in the content other than the default next element as defined above. This method for moving the element focus in the content provides an advantage over previous methods of defining navigation order within the content, because this method does not require the content developer to expressly define a navigation order by setting a tab index order or other numerical navigation order for each element in the content. The next element to gain focus can be identified by name, for example by its Document Object Model (DOM) identity.

Figure 13:
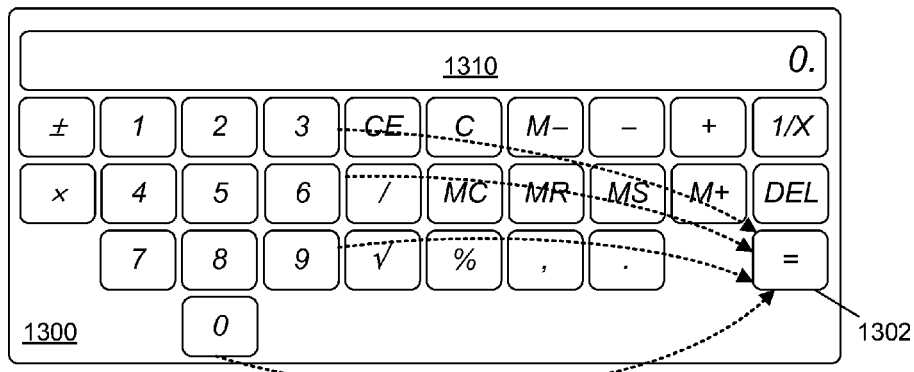
FIG. 13 is a further example of content comprising customized navigable elements.

An example is provided in FIG. 13. Content 1300 represents a calculator application displayable on the communication device 100 and constructed using HTML elements. Each virtual button of the calculator 1300 may be a focusable button element. It may be determined that typical user behaviour, once numerals have been entered using the various numbered buttons, is for the user to focus on and actuate the "equals" button 1302. However, it will be appreciated that in accordance with the default navigation behaviour described above, if one of the number keys such as the "3" button is currently in focus, several actions are required on the part of the user to traverse the content 1300 to move the focus to the button 1302, since the user must provide commands to the communication device 100 to repeatedly move the focus to the right and/or down. Accordingly, it may be useful to customize the navigation flow within the content 1300.

Thus, in a further embodiment, the number button elements corresponding to "0", "3", "6" and "9" maybe be customized so that upon an instruction to move the focus from one of the "3", "6" or 9 buttons to the right, the focus jumps to the equals button 1302; and upon an instruction to move the focus from the "0" button to the right or down, the focus also jumps to the equals button. Example code for specific button elements in content 1300 (omitting code directed to other elements, specific functions, and presentation) is provided below:

```
<HTML>
<HEAD>
<SCRIPT type=text/javascript>
function MoveToEquals( ) {navigation.setFocus("buttoneq");}
function Calculate ( ) { [script omitted] }
function OperateOnValue( ) { [script omitted] }
</SCRIPT>
<BODY>
```

. . .
<input type="button" value="3" name="three" x-onNavRight="MoveToEquals( )" onClick="OperateOnValue( )";/>
. . .
<input type="button" name="buttoneq" value="=" onClick="Calculate( )";/>
. . .
<input type="button" value="0" name="zero" x-onNavRight="MoveToEquals( )" x-onNavDown="MoveToEquals( )" onClick="OperateOnValue( )";/>
. . .
</BODY>
</HTML>

In the above example, the "3" button is provided with an "x-onNavRight" attribute that calls the function "MoveToEquals( )", and an "onClick" attribute that calls the function "OperateOnValue( )". When the "3" button is in focus and is actuated (with a "click"), the event is trapped and the corresponding function, "OperateOnValue( )", is called. This function may carry out steps associated with the value assigned to the "3" button, such as displaying the number "3" in the display bar 1310 or adding the value 3 to a register. When the "3" button is in focus and a command to move focus to the right is detected, the "MoveToEquals( )" function is called, which in turn sets the focus on the equal button, as indicated by the function "MoveToEquals( )" defined above. This function invokes an extension, "navigation.setFocus", that sets the focus to an identified destination element within the content 1300. In the example of FIG. 13, the destination is identified as "buttoneq", which is the name of the equals button 1302 in the sample code given above.

When the "0" button is in focus and a command to move focus either to the right or down is detected, again the "MoveToEquals( )" function is called, with the same result. The various elements in the content 1300 may be provided with further attributes to trap additional user interface events, such as clicking ("onClick"), mousedown, mouseup, and the like. Trapping of other similar events using event handler commands and invocation of scripts in response to the detection of such events will be known to those skilled in the art.

In addition, while the various buttons of content 1300 may normally be focusable, it may be desirable to disable some elements so that they are not focusable until certain conditions are met. For example, the equals button 1302 may have an "x-focusable" attribute set to "false" so long as no values have been input by the user or displayed in the display bar 1310 of the content 1300, but once values have been input and displayed in the display bar 1310, the "x-focusable" attribute of the equals button 1302 may be dynamically modified to change the attribute to "true".

Figure 14:
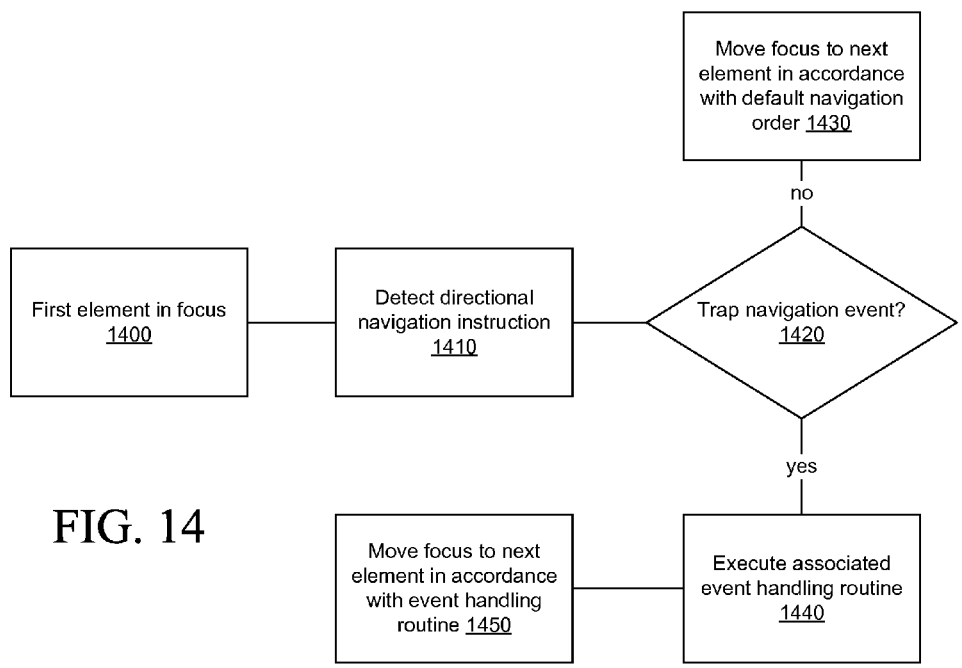
FIG. 14 is a flowchart illustrating a navigation flow from one element to the next in content implementing event handling routines.

A generalized navigation flow for content including focusable elements and attributes for trapping events and invoking event handling routines is provided in FIG. 14. At 1400, a first element in the content is in focus. A navigation instruction, such as an instruction to move the focus in a particular direction, is detected at 1410. At 1420, it is determined whether the first element is associated with an attribute for trapping the navigation event associated with the instruction; if it is not, then focus moves to the next element in accordance with the default navigation order at 1430, for example in accordance with the rules described in connection with FIGS. 7A through 11. If the event is to be trapped and handled in a different manner, then at 1440 the event handling routine is executed. The event handling routine may cause focus to be moved to another element at 1450.

Thus, by implementing event handling routines that trap navigation instructions received from the user, the navigation order of elements within the content can be altered in response to user behaviour or user input. For example, when a webpage document for an e-commerce website is displayed by the client application, navigation through the page may follow the default methods described above. However, if it is determined that the user has not logged into the server serving the web page (this could be determined, for example, using cookies stored at the communication device 100), any user attempt to move the focus through the content or to actuate any element on the page may be trapped, and an event handling routine forcing the focus to be set on website terms of use located at the bottom of the page may be invoked.

The content may also be constructed to trap user attempts to move focus in a particular direction, and handle the event accordingly. For example, on an e-commerce website, a first image of an item for purchase may be displayed on a webpage immediately to the left of a "buy now" button, which may gain focus and be actuated by the user to add the item to a shopping cart. Alternate images of the item may be available, but not displayed on the webpage. The webpage document may be constructed such that when the first image is in focus, user attempts to move focus to the right (i.e., towards the "buy now" button) are trapped and trigger an event handling routine that loads the next available item image in place of the first image, and that each subsequent attempt to move focus to the right causes subsequent images to be loaded. Once the last image is loaded, a further attempt on the part of the user to move focus to the right results in focus being moved to the "buy now" button.

The foregoing embodiments thus provide for a method of navigating or traversing structured content from element to element, according to specific rules to enhance user experience. The foregoing embodiments also provide for the creation or removal of focusable elements in structured content that may then form part of, or be excluded from, the navigation flow of the content, whether those elements are enabled, disabled, capable or incapable of being actuated by the user. The navigation flow of the content may also be customized through the use of event handling routines that are triggered by detected user interface events, such as a user attempt to move focus from the current element in focus to another. The navigation flow may be altered dynamically to respond to user behaviour or user input.

The systems and methods disclosed herein are presented only by way of example and are not meant to limit the scope of the invention. Other variations of the systems and methods described above will be apparent to those in the art and as such are considered to be within the scope of the invention. For example, reading direction may influence the user's expectation of which element should logically be next to come into focus when a page is traversed. It will be appreciated that the embodiments described herein are directed to a Western-style reading direction, in which text is presented in horizontal lines and traversed from left to right, and the subsequent line of text is arranged below the current line. As such, traversing the page in a "downward" direction or from left to right implies that the page is being traversed in a common reading direction, whereas traversing the page from bottom to top or from right to left implies that the page is being traversed in a less common reading direction. It will be understood by persons skilled in the art that these embodiments may be adapted for use with other reading directions (such as bottom to top and/or right to left) to accommodate the user's expectations. Furthermore, although the determination of element positions was described above in connection with a rectangular (x, y) grid and rectangular element shapes, it will be appreciated that other methods of determining element position that are not restricted to rectangular shapes may be used.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method implemented by an electronic device comprising a display screen, the method comprising:
receiving a document and an event handling script, the document comprising a plurality of elements, the event handling script being associated with at least one element of the plurality of elements;
rendering and displaying at least a portion of the document on the display screen, the displayed portion of the document including at least a first focusable element of the plurality of elements;
establishing a focus on the first focusable element; and
in response to a first navigation instruction received by the electronic device while the focus is established on the first focusable element,
when the event handling script is not associated with the first focusable element, moving the focus to a second focusable element of the plurality of elements immediately following the first focusable element according to a default navigation order established on the electronic device prior to receipt of the event handling script; and
when the event handling script is associated with the first focusable element, executing the event handling script to move the focus to a further focusable element of the plurality of elements other than the second focusable element, and wherein the event handling script establishes a custom navigation order for moving the focus from the first focusable element to the further focusable element, and wherein the custom navigation order is different than the default navigation order.

2. The method of claim 1, wherein the event handling script is not associated with the first focusable element, the focus thus being moved to the second focusable element according to the default navigation order, the method further comprising:
in response to a second navigation instruction received by the electronic device while the focus is established on the second focusable element,
when the event handling script is not associated with the second focusable element, moving the focus to a third focusable element of the plurality of elements immediately following the second focusable element according to the default navigation order; and
when the event handling script is associated with the second focusable element, executing the event handling script to move the focus to a further focusable element of the plurality of elements other than the third focusable element.

3. The method of claim 2, wherein the second navigation instruction is a repeat of the first navigation instruction.

4. The method of claim 1, wherein the first navigation instruction comprises input received by a pointing input device.

5. The method of claim 1, wherein the first navigation instruction comprises input received by a touch input device.

6. The method of claim 1, wherein the plurality of elements comprise HTML elements, and at least one of the first focusable element and the further focusable element comprises an element other than a text entry element, selection element, button element, hyperlink element, anchor element, or interactive image element.

7. The method of claim 1, wherein the plurality of elements comprise HTML elements, and at least one of the first focusable element and the further focusable element comprises an element other than an element that by default is capable of gaining focus in response to the first navigation instruction, the at least one of the first focusable element and the further focusable element being made focusable by an explicit setting of an associated attribute for that element in the document.

8. The method of claim 1, wherein the event handling script is comprised in the document.

9. A non-transitory electronic device-readable medium bearing code which, when executed by one or more processors of an electronic device comprising a display screen, causes the electronic device to implement the method of:
receiving a document and an event handling script, the document comprising a plurality of elements, the event handling script being associated with at least one element of the plurality of elements;
rendering and displaying at least a portion of the document on the display screen, the displayed portion of the document including at least a first focusable element of the plurality of elements;
establishing a focus on the first focusable element; and
in response to a first navigation instruction received by the electronic device while the focus is established on the first focusable element,
when the event handling script is not associated with the first focusable element, moving the focus to a second focusable element of the plurality of elements immediately following the first focusable element according to a default navigation order established on the electronic device prior to receipt of the event handling script; and
when the event handling script is associated with the first focusable element, executing the event handling script to move the focus to a further focusable element of the plurality of elements other than the second focusable element, wherein the event handling script establishes a custom navigation order for moving the focus from the first focusable element to the further focusable element, and wherein the custom navigation order is different than the default navigation order.

10. The non-transitory electronic device-readable medium of claim 9, wherein the event handling script is not associated with the first focusable element, the focus thus being moved to the second focusable element according to the default navigation order, and the method further comprises:
in response to a second navigation instruction received by the electronic device while the focus is established on the second focusable element,
when the event handling script is not associated with the second focusable element, moving the focus to a third focusable element of the plurality of elements immediately following the second focusable element according to the default navigation order; and
when the event handling script is associated with the second focusable element, executing the event handling script to move the focus to a further focusable element of the plurality of elements other than the third focusable element.

11. The non-transitory electronic device-readable medium of claim 10, wherein the second navigation instruction is a repeat of the first navigation instruction.

12. The non-transitory electronic device-readable medium of claim 9, wherein the first navigation instruction comprises input received by either pointing input device or a touch input device.

13. The non-transitory electronic device-readable medium of claim 9, wherein the plurality of elements comprise HTML elements, and at least one of the first focusable element and the further focusable element comprises an element other than a text entry element, selection element, button element, hyperlink element, anchor element, or interactive image element.

14. The non-transitory electronic device-readable medium of claim 9, wherein the plurality of elements comprise HTML elements, and at least one of the first focusable element and the further focusable element comprises an element other than an element that by default is capable of gaining focus in response to the first navigation instruction, the at least one of the first focusable element and the further focusable element being made focusable by an explicit setting of an associated attribute for that element in the document.

15. The non-transitory electronic device-readable medium of claim 9, wherein the event handling script is comprised in the document.

16. An electronic device, comprising:
a display screen;
at least one communication subsystem; and
at least one processor configured to implement the method of:
receiving a document and an event handling script using the at least one communication subsystem, the document comprising a plurality of elements, the event handling script being associated with at least one element of the plurality of elements;
rendering and displaying at least a portion of the document on the display screen, the displayed portion of the document including at least a first focusable element of the plurality of elements;
establishing a focus on the first focusable element; and
in response to a first navigation instruction received by the electronic device while the focus is established on the first focusable element,
when the event handling script is not associated with the first focusable element, moving the focus to a second focusable element of the plurality of elements immediately following the first focusable element according to a default navigation order established on the electronic device prior to receipt of the event handling script; and
when the event handling script is associated with the first focusable element, executing the event handling script to move the focus to a further focusable element of the plurality of elements other than the second focusable element, and wherein the event handling script establishes a custom navigation order for moving the focus from the first focusable element to the further focusable element, and wherein the custom navigation order is different than the default navigation order.

17. The electronic device of claim 16, wherein the event handling script is not associated with the first focusable element, the focus thus being moved to the second focusable element according to the default navigation order, and the method further comprises:

in response to a second navigation instruction received by the electronic device while the focus is established on the second focusable element, when the event handling script is not associated with the second focusable element, moving the focus to a third focusable element of the plurality of elements immediately following the second focusable element according to the default navigation order; and when the event handling script is associated with the second focusable element, executing the event handling script to move the focus to a further focusable element of the plurality of elements other than the third focusable element.

18. The electronic device of claim 17, wherein the second navigation instruction is a repeat of the first navigation instruction.

19. The electronic device of claim 16, wherein the plurality of elements comprise HTML elements, and at least one of the first focusable element and the further focusable element comprises an element other than a text entry element, selection element, button element, hyperlink element, anchor element, or interactive image element.

20. The electronic device of claim 16, wherein the event handling script is comprised in the document.

\* \* \* \* \*